(12) United States Patent
Peirce

(10) Patent No.: US 9,561,584 B2
(45) Date of Patent: Feb. 7, 2017

(54) TOOL FOR COUPLING FLUID LINES

(71) Applicant: AMERICAN GREASE STICK COMPANY, Muskegon, MI (US)

(72) Inventor: John M. Peirce, Portage, MI (US)

(73) Assignee: American Grease Stick Company, Muskegon, MI (US)

(*) Notice: Subject to any disclaimer, the term of this patent is extended or adjusted under 35 U.S.C. 154(b) by 1094 days.

(21) Appl. No.: 13/653,538

(22) Filed: Oct. 17, 2012

(65) Prior Publication Data

US 2013/0093184 A1    Apr. 18, 2013

Related U.S. Application Data

(60) Provisional application No. 61/548,472, filed on Oct. 18, 2011, provisional application No. 61/594,661, filed on Feb. 3, 2012.

(51) Int. Cl.
| | |
|---|---|
| B25B 27/10 | (2006.01) |
| F16L 33/22 | (2006.01) |
| F16L 37/138 | (2006.01) |

(52) U.S. Cl.
CPC .............. *B25B 27/10* (2013.01); *F16L 33/225* (2013.01); *F16L 37/138* (2013.01); *Y10T 29/49908* (2015.01); *Y10T 29/5367* (2015.01)

(58) Field of Classification Search
CPC ............ B25B 27/02; B25B 27/10; B25B 7/02; B25B 7/04; B21D 39/048; F16L 2013/145; F16L 33/225; F16L 37/138
See application file for complete search history.

(56) References Cited

U.S. PATENT DOCUMENTS

| | | | |
|---|---|---|---|
| 3,375,026 A | 3/1968 | Szohatsky | |
| 3,474,519 A | 10/1969 | Hallesy | |
| (Continued) | | | |

FOREIGN PATENT DOCUMENTS

| | | |
|---|---|---|
| CA | 1050249 | 3/1979 |
| DE | 8807923 | 9/1988 |
| DE | 20102624 | 4/2001 |

OTHER PUBLICATIONS

International Search Report and Written Opinion dated Jan. 15, 2013 for corresponding PCT Application No. PCT/US2012/060505.
(Continued)

*Primary Examiner* — James Hewitt
(74) *Attorney, Agent, or Firm* — Gardner, Linn, Burkhart & Flory, LLP

(57) ABSTRACT

A swage or coupling tool is provided for use in coupling a fluid line to a compression fitting, a fluid coupler, or the like. The swage tool provides multiple degrees of freedom and/or multiple pivots or pivot joints to facilitate and maintain alignment of the jaws with the compression fitting during use of the swage tool to facilitate properly-aligned assembly of the compression fitting, and to limit bending or kinking of the fluid line when the fitting is being attached. The swage tool includes a pair of movable jaws, which may have stepped or rounded engagement surfaces, which may be forced against corresponding engagement surfaces of the compression fitting to securely assemble the fitting to the fluid line. The shape of the engagement surfaces facilitates properly-aligned assembly of the compression fitting, and limits bending or kinking of the fluid line when the fitting is being attached.

33 Claims, 10 Drawing Sheets

(56) References Cited

U.S. PATENT DOCUMENTS

| | | | |
|---|---|---|---|
| 3,653,115 A | 4/1972 | Perkins | |
| 3,722,065 A | 3/1973 | Harris | |
| 3,771,343 A | 11/1973 | Dawson | |
| 3,848,451 A | 11/1974 | Allin | |
| 4,047,420 A | 9/1977 | Edwards | |
| 4,067,224 A | 1/1978 | Birks | |
| 4,189,817 A | 2/1980 | Moebius | |
| 4,257,135 A | 3/1981 | Moebius | |
| 4,292,833 A | 10/1981 | Lapp | |
| 4,345,361 A | 8/1982 | Baumann | |
| 4,461,193 A | 7/1984 | Gruber et al. | |
| 4,483,056 A | 11/1984 | Schwalm et al. | |
| 4,708,034 A * | 11/1987 | Oetiker | B25B 7/00 81/9.3 |
| 4,757,588 A | 7/1988 | Churchich | |
| 5,069,058 A | 12/1991 | Hyatt | |
| 5,305,510 A | 4/1994 | Croft et al. | |
| 5,332,269 A | 7/1994 | Homm | |
| 5,398,394 A | 3/1995 | Hyatt et al. | |
| 5,405,176 A | 4/1995 | Babel et al. | |
| 5,452,921 A | 9/1995 | Hyatt et al. | |
| 5,483,731 A | 1/1996 | Prendel et al. | |
| 5,592,726 A | 1/1997 | Suresh | |
| 5,611,236 A * | 3/1997 | Grunwald | B25B 27/10 72/409.01 |
| 5,680,687 A | 10/1997 | Hyatt et al. | |
| 5,694,670 A | 12/1997 | Hosseinian et al. | |
| 6,199,254 B1 | 3/2001 | Suresh | |
| 6,450,553 B1 | 9/2002 | Suresh | |
| 6,463,778 B1 | 10/2002 | Johnston | |
| 6,517,126 B1 | 2/2003 | Peterson et al. | |
| 6,739,172 B2 * | 5/2004 | Wagner | B25B 7/12 72/407 |
| 7,140,278 B2 | 11/2006 | Neumann et al. | |
| 7,146,888 B2 | 12/2006 | Martinka | |
| 7,155,790 B2 | 1/2007 | Palejwala et al. | |
| 7,156,004 B1 * | 1/2007 | Whitehead | B25B 7/02 81/420 |
| 7,337,514 B2 | 3/2008 | McKay | |
| 7,338,090 B2 | 3/2008 | Baldwin et al. | |
| 7,350,393 B2 * | 4/2008 | Li | B25B 7/04 29/751 |
| 7,628,052 B2 * | 12/2009 | Zhang | B25B 27/146 72/409.16 |
| 7,874,881 B1 | 1/2011 | Sosa et al. | |
| 9,010,221 B2 * | 4/2015 | Neumann | B25B 7/12 81/314 |
| 2007/0283741 A1 | 12/2007 | Bernstorf et al. | |
| 2009/0007734 A1 * | 1/2009 | Lulewicz | B25B 7/00 81/415 |
| 2009/0066082 A1 | 3/2009 | Kainec | |
| 2010/0171309 A1 | 7/2010 | Kainec | |
| 2010/0308523 A1 | 12/2010 | Neumann | |
| 2011/0041326 A1 | 2/2011 | Xie et al. | |

OTHER PUBLICATIONS

Central Forge Ratcheting Crimping Tool, available at www.harborfreight.com/ratcheting-crimping-tool-97420, believed to have been published more than one year prior to the earliest filed of the present application.

* cited by examiner

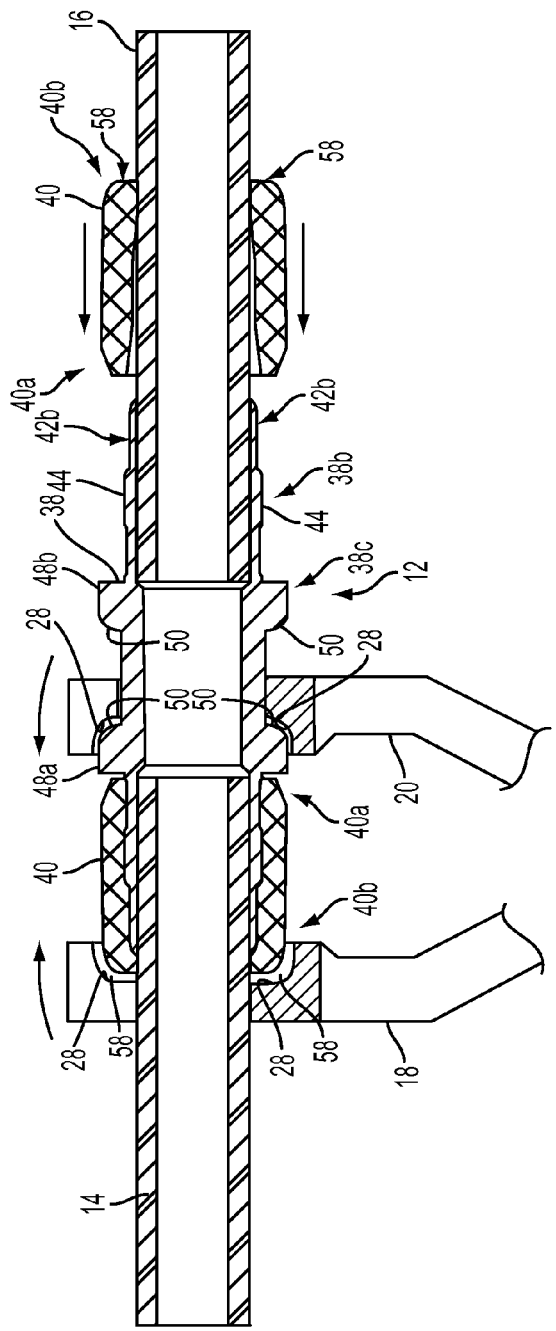
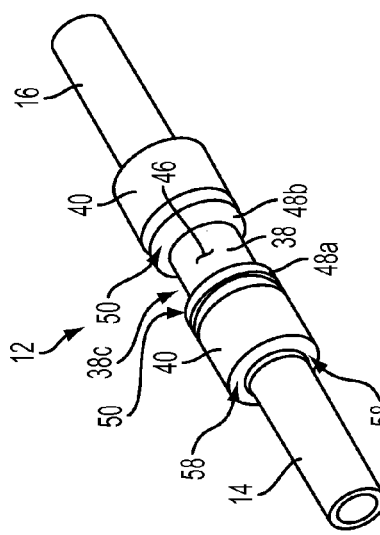

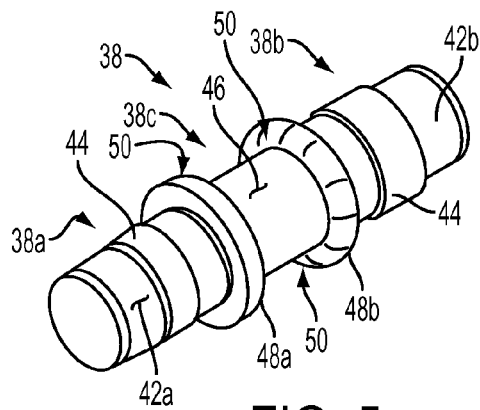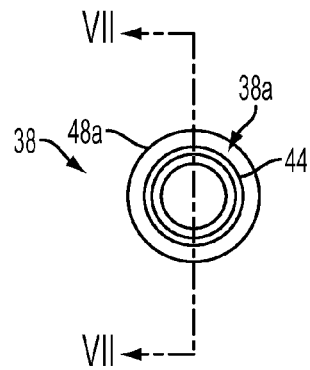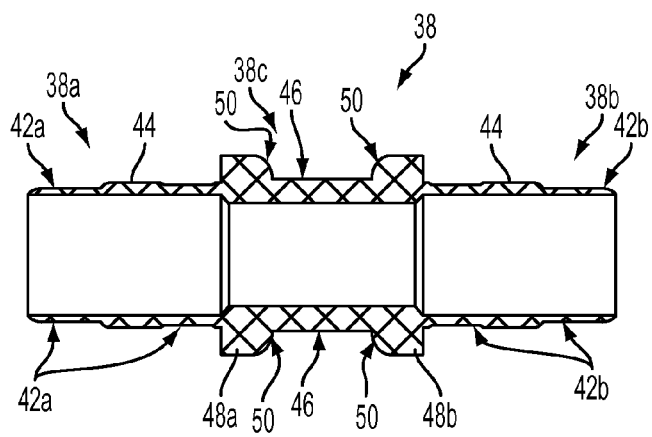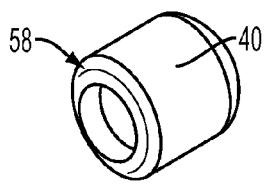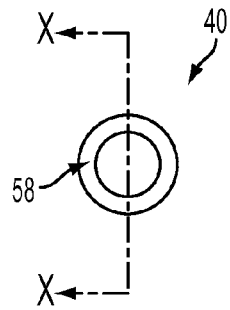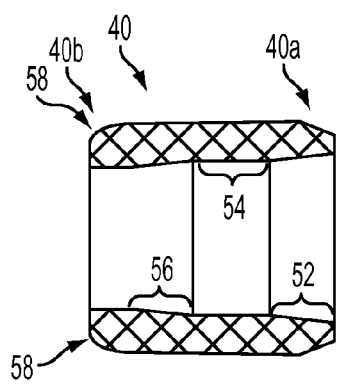

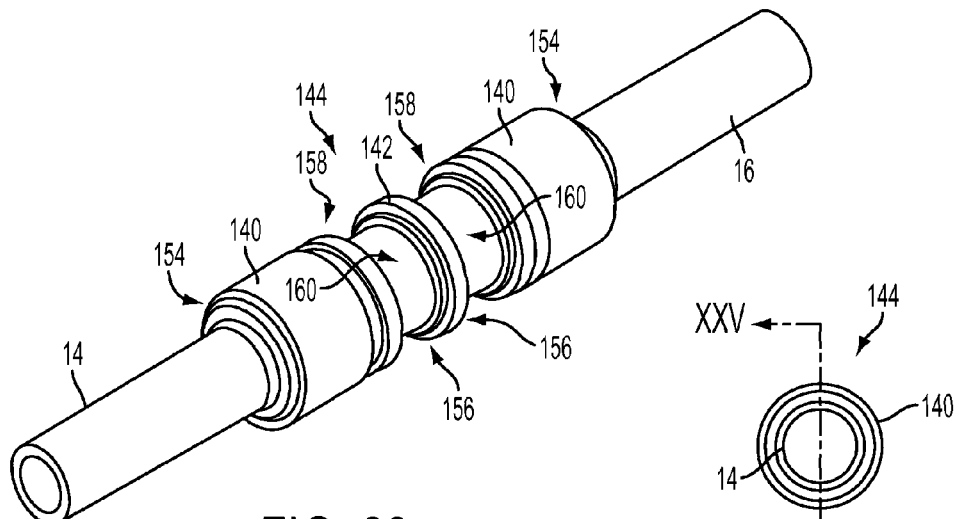
FIG. 23
FIG. 24
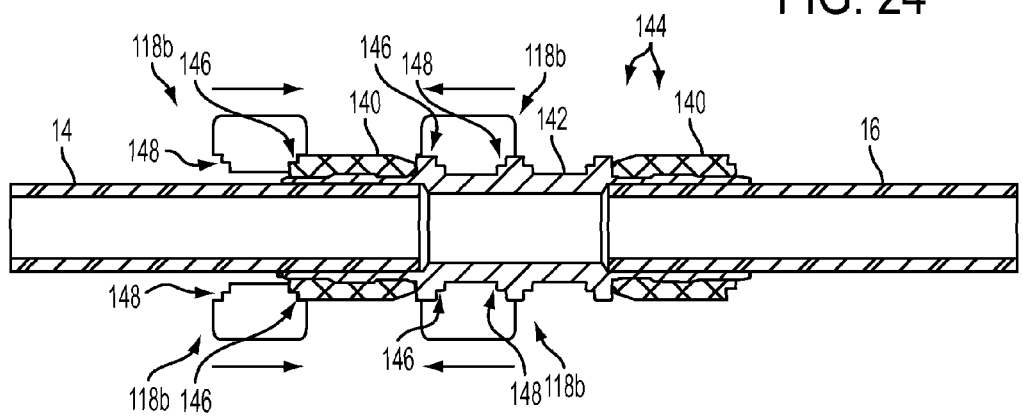
FIG. 25
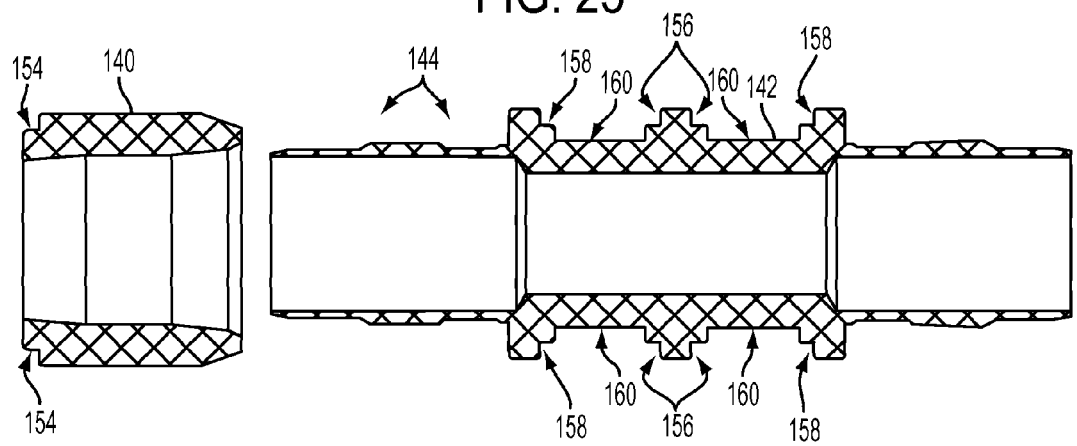
FIG. 26

TOOL FOR COUPLING FLUID LINES

CROSS REFERENCE TO RELATED APPLICATIONS

The present application claims the benefit of U.S. provisional application Ser. No. 61/548,472, filed Oct. 18, 2011, and of U.S. provisional application Ser. No. 61/594,661, filed Feb. 3, 2012, which are hereby incorporated herein by reference in their entireties.

FIELD OF THE INVENTION

The present invention relates generally to tools and fittings for joining fluid couplers to fluid lines.

BACKGROUND OF THE INVENTION

Fluid lines, conduits, hoses and the like are commonly used for conveying fluids from one portion of a vehicle to another. Such conduits may be associated with fuel, engine and transmission oils and other lubricants, power steering fluid, coolants or refrigerants, hydraulic brake fluids, shock absorber fluid, ride-height control fluid and/or the like. When such fluid lines are being repaired or replaced, a compression fitting including a main body and one or more barrels or "ferrules" may be used to securely couple an end of one fluid line to the end of another fluid line. Typical compression fittings have squared edges for engagement by a compression tool, such as manual tongs or pliers or automated bench mounted tools, which have correspondingly-shaped squared-edge engagement surfaces that may apply uneven pressure to the compression fitting particularly when the fluid line and fitting are misaligned with the tool, or due to arcuate pivoting movement of the jaws of the tool during the pressing of the ferrule onto the fitting or connector and fluid line.

SUMMARY OF THE INVENTION

The present invention provides a swage tool for use in coupling a compression fitting to a fluid line, while applying substantially even compression forces to a ferrule and a main body of the compression fitting, even when the compression fitting and the swage tool are somewhat misaligned during the pressing of the ferrule onto the fitting and fluid line. The swage tool and ferrules and body of the compression fitting have corresponding surfaces that are generally in the shape of stepped surfaces, or spherical zone surfaces, or partially spherical or rounded surfaces, that engage one another to permit at least initial pivoting or swiveling movement of the ferrule and/or body of the compression fitting relative to the swage tool, while maintaining consistent contact along the corresponding surfaces throughout the range of motion of the tool during the pressing of the ferrule onto the fitting and fluid line.

According to an aspect of the present invention, a swage tool includes first and second jaws that are movable relative to one another between a compression position in which the jaws are closer together, and a non-compression position in which the jaws are spaced further apart. The tool may have a pair of arms pivotally attached to one another at one end, such as at a handle portion or the like, and with a respective jaw attached at the other end. The arms are movable between the compression and non-compression positions via rotation of a threaded cross member or driving member that is pivotally mounted at each of the arms. The pivotal mounting of the cross member at the arms provides self-aligning pivot mounts for the threaded cross member, thereby limiting or substantially precluding binding of the threaded cross member as it is rotated to move the arms between their compression and non-compression positions. The first jaw includes a ferrule-engaging surface for engaging the barrel-shaped ferrule of a compression fitting, and the second jaw defines a body-engaging surface for engaging the main body of the compression fitting. The jaws are pivotally mounted at the ends of the arms, such that the tool has a plurality of pivots or pivot joints that cooperate to maintain alignment of the jaws with the compression fitting. For example, the tool may include at least three pivots, including the pivotal connection of the ends of the arms at the handle and/or to one another, the pivotal mount for the threaded cross member at one of the arms, and the pivotal mount of one of the jaws at one of the arms. Preferably, the tool includes at least five pivots or pivot joints (the pivotal connection of the arms at the handle and/or to one another, the pivotal mounts for the threaded cross member at each arm, and the pivotal mounts of the jaws at each arm) that cooperate to maintain substantial alignment of the ferrule-engaging surface and body-engaging surface of the jaws with the barrel-shaped ferrule and main body of the compression fitting when positioning a fitting at the jaws and throughout the range of pivotal movement of the arms during the coupling process of the tool, which moves the jaws between the non-compression or open position and the compression position.

Optionally, at least one of the ferrule-engaging surface and the body-engaging surface may be generally shaped as generally U-shaped stepped surfaces for engaging respective stepped engagement surfaces of the ferrule and the main body of the compression fitting.

Optionally, at least one of the ferrule-engaging surface and the body-engaging surface may be generally shaped as a spherical zone surface or a partially spherical or rounded surface for engaging a respective one of the ferrule and the main body of the compression fitting. The ferrule-engaging surface defines an opening or slot, such as a U-shaped slot for receiving a fluid line associated with the compression fitting. The ferrule and body of the compression fitting maintain consistent or even contact along the corresponding engagement surfaces during the pressing of the ferrule onto the fitting and fluid line.

According to another aspect of the present invention, a fluid line stabilizer is provided for securely holding a flexible fluid line during attachment of a fluid line coupler. The fluid line stabilizer includes a fluid line clamping portion and a fluid line stabilizing portion. The clamping portion is sized to releasably attach to a fluid line, and has an inner diameter that is at least slightly smaller than the outer diameter of the fluid line. The inner surface of the clamping portion may have a textured inner surface for engaging the outer surface of the fluid line, whereby the fluid line is substantially secured relative to the clamping portion and fluid line stabilizer when the clamping portion is clamped at the fluid line. The stabilizing portion of the fluid line stabilizer has an inner diameter that is larger than the outer diameter of the fluid line. An engagement surface is established at the outer portion of the fluid line stabilizer and is configured for engagement by a compression tool that applies a force to the fluid line stabilizer in an axial direction, such as for inserting the hose-barb end of a fluid line coupler into the open end of the fluid line, which is disposed inside the stabilizing portion of the fluid line stabilizer. The larger diameter stabilizing portion allows for radial expansion of the fluid line as the barb end of the coupler is inserted therein, while limiting or substantially precluding bending of the fluid line during the connection process. Thus, one of the jaws of the tool, described above, may engage the engagement surface of the fluid line stabilizer and another of the jaws may engage a surface of a fluid line coupler, whereby rotational driving of the threaded cross member draws the jaws towards one another to urge the barbed end of the fluid line coupler into the end portion of the fluid line that is disposed at and retained at the stabilizing portion of the fluid line stabilizer.

Thus, the swage or coupling tool of the present invention facilitates coupling a fluid line to a compression fitting without need for perfect alignment of the compression fitting with the fluid line in order to achieve a substantially even application of compressive force to the ferrule and main body of the compression fitting during the coupling process. The swage tool can limit or prevent misaligned or uneven assembly of the barrel or ferrule of the compression fitting to the main body of the fitting, to reduce or prevent the risk of fluid leaks at the fitting, and to enable an operator to work more quickly because the tool can tolerate a degree of misalignment between the compression fitting and the fluid line. In addition, a fluid line stabilizer may be used in conjunction with the swage tool for securely holding a flexible fluid line, to limit or prevent buckling or bending of the fluid line during attachment of a fluid line coupler.

These and other objects, advantages, purposes and features of the present invention will become apparent upon review of the following specification in conjunction with the drawings.

BRIEF DESCRIPTION OF THE DRAWINGS

FIG. 1 is a side sectional view of the jaws of a swage tool in accordance with the present invention, shown just after fully seating a ferrule at the main body of a compression fitting, and with another ferrule shown prior to installation;

FIG. 2 is a perspective view of the compression fitting and corresponding fluid lines of FIG. 1, shown after assembly;

FIG. 5 is an enlarged perspective view of the main body of the compression fitting of FIGS. 1 and 2;

FIG. 6 is an end elevation of the main body of the compression fitting;

FIG. 7 is a side sectional view of the main body of the compression fitting, taken along section line VII-VII of FIG. 6;

FIG. 8 is an enlarged perspective view of a barrel or ferrule of the compression fitting of FIGS. 1 and 2;

FIG. 9 is an end elevation of the ferrule of FIG. 8;

FIG. 10 is a side sectional view of the ferrule, taken along section line X-X in FIG. 9;

FIG. 23 is a perspective view of an assembled compression fitting configured for engagement by the swage tool and jaw elements of FIG. 16, and shown joining a pair of fluid lines;

FIG. 24 is an end elevation of the compression fitting and fluid lines of FIG. 23;

FIG. 25 is a side sectional elevation of the compression fitting and fluid lines, taken along section XXV-XXV in FIG. 24; and FIG. 26 is another side sectional elevation of the main body of the compression fitting, shown prior to engagement by a barrel or ferrule of the fitting.

DESCRIPTION OF THE PREFERRED EMBODIMENTS

Figure 3:
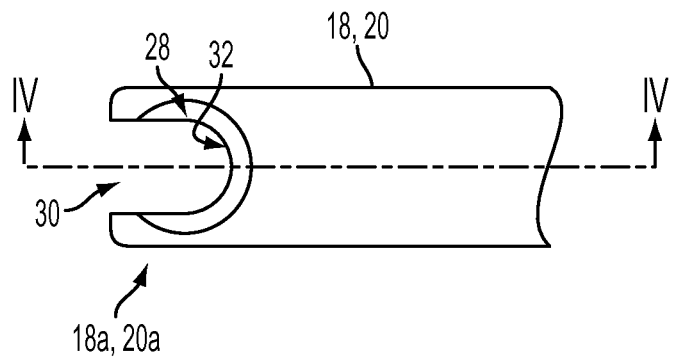
FIG. 3 is a top plan view of an end portion of one jaw of the swage tool of FIG. 1.

Referring now to the drawings and the illustrative embodiments depicted therein, a compression or coupling or swage tool is provided for securing a compression fitting 12 to the end portions of respective fluid lines 14, 16 (FIGS. 1 and 2). The swage tool may comprise any suitable tool that includes first and second jaws 18, 20 that are coupled relative to one another for movement between a compression position, where the jaws are close enough together to fully seat the ferrule or barrel at the body of the compression fitting (such as shown in FIG. 1), and an expanded or non-compression position, where the jaws are spaced further apart to receive the fitting components therebetween. The jaws 18, 20 are actuatable via an actuation portion, which may be in the form of a pair of handles or gripping members so that swage tool 10 can be operated like a manual pliers or the like, or which may be operated in a manner like that of swage tool 110, discussed below. It will be appreciated that alternative swage tools and jaws having different configurations may be used, such as will be described below, without departing from the spirit and scope of the present invention.

Figure 4:
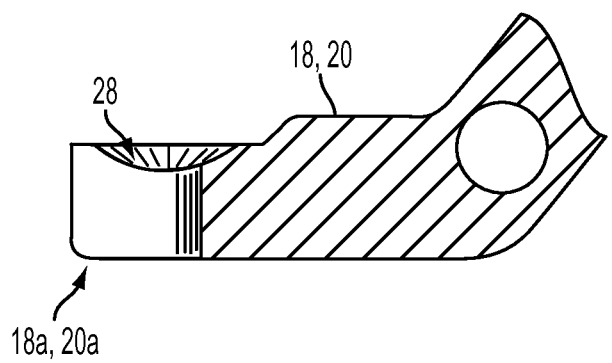
FIG. 4 is a side sectional view of the jaw end portion taken along line IV-IV in FIG. 3.

In the illustrated embodiment of FIGS. 1, 3 and 4, each jaw 18, 20 may include a generally bowl-shaped or partial spherical-shaped engagement surface 28, which allows the engagement surfaces to engage respective convex rounded engagement surfaces on the compression fitting 12. Thus, the engagement surfaces 28 of jaws 18, 20 can contact and move relative to the engagement surfaces of compression fitting 12 in a manner similar to ball-and-socket joints, allowing for more even application of compression pressure, as will be described in more detail below. Although shown and described as having the jaws comprise concave recessed surfaces for engaging convex surfaces of compression fittings or the like, it is envisioned that the engagement surfaces of the jaws may comprise generally convex rounded engagement surfaces and the engagement surfaces of the fittings may comprise generally concave recessed or rounded engagement surfaces, without departing from the spirit and scope of the present invention, in order to provide the ball-and-socket joint or interface between the jaws and the fitting or the like.

Engagement surfaces 28 are each shaped as a portion of a spherical "zone". It should be understood that the term "zone" or "spherical zone," as used herein, is given its normal geometrical meaning as the curved surface of a spherical segment, which is defined as the portion of a sphere that is cut off or truncated by two parallel planes. Hence, engagement surfaces 28 are each shaped as a portion of the surface of a sphere (either a recess in that shape or a protrusion in that shape). However, it will be appreciated that engagement surfaces 28 may be substantially any annular or partial-annular concave shape while remaining within the spirit and scope of the present invention, and need not be true or precise spherical zone shapes. For example, and such as shown in FIG. 1, the engagement surfaces 28 are rounded partial-annular concave surfaces, but are not shaped as a portion of a true spherical zone, which is more closely approximated as shown in FIG. 4.

As best shown in FIG. 3, engagement surface 28 is formed in a distal end portion 18a, 20a of the respective jaws 18, 20, which may be identical or substantially identical or mirror images of one another. A generally U-shaped slot or channel or opening 30 (FIG. 3) is formed in each distal end portion 18a, 20a, and is partially surrounded by engagement surface 28. The U-shaped slot 30 of first jaw 18 is defined in part by a semi-circular surface 32 having a diameter that is at least somewhat greater than that of the outer diameter of fluid line 14. Similarly, second jaw 20 includes a semi-circular surface having a diameter that is at least slightly greater than the diameter of a middle portion of compression fitting 12, so that the U-shaped slots 30 of jaws 18, 20 can receive the fluid line 14 and middle portion of compression fitting 12, respectively, as shown in FIG. 1. The precise shape and dimensions of spherical zone-shaped engagement surfaces 28 and U-shaped slots 30 may be selected according to the dimensions of the fluid lines 14, 16 and the components of the compression fitting 12, as will be described in more detail below.

It will be appreciated that the actuation portion of the swage tool may be substantially conventional to permit pivoting or generally linear translating movement of the jaws 18, 20 relative to one another when the tool is actuated. It will be appreciated that jaws 18, 20 may be fitted to other types of manual pliers or tongs, such as tongs of the type described in U.S. Pat. No. 7,140,278, the disclosure of which is hereby incorporated herein by reference. Optionally, and desirably, the jaws may be configured for use with the swage tool 110, 110', discussed below.

Compression fitting 12 includes a tubular main body 38 and a pair of barrels or ferrules 40 that attach to outboard end portions 38a, 38b of main body 38 (FIGS. 1, 2 and 5-7). Each end portion 38a, 38b of main body 38 has an inner diameter than generally corresponds to the outer diameter of fluid lines 14, 16, respectively, so that the fluid lines 14, 16 fit snugly into the respective end portions 38a, 38b of main body 38 (FIGS. 1 and 2). Each outboard end portion 38a, 38b of main body 38 has a shaped or contoured outer surface 42a, 42b with an increased-diameter central collar or flange portion 44 that is engaged by a respective ferrule 40 when the ferrule is pressed into place at the body 38, as will be described below. Main body 38 further includes a middle portion 38c having a generally constant-diameter cylindrical outer surface 46 with an annular flange 48a, 48b at either end thereof (FIGS. 5 and 7). Each annular flange 48a, 48b has a convex rounded (such as, for example, a spherical zone) surface 50 on an inboard side thereof, each facing middle portion 38c of the main body 38. Engaging surfaces 50 are shaped to generally match the corresponding engagement surface 28 of second jaw 20, such as shown in FIG. 1. It will be appreciated that the corresponding spherical zone shapes of engagement surfaces 28, 50 allow the surfaces to engage and move relative to one another, similar to a ball-and-socket joint, such as due to pivoting or swiveling of second jaw 20 relative to main body 38 of the compression fitting 12 during the pressing of the ferrule onto the fitting and fluid line. Optionally, the main body 38 may include a central raised portion or annular wall that provides an engagement surface for one of the jaws so that the jaws engage the central raised portion of the main body and the ferrule during the coupling of the fluid line to the compression fitting.

Each ferrule 40 (such as shown in FIGS. 8-10) has an inboard end portion 40a that faces a respective one of the annular flanges 48a, 48b of main body 38, and an outboard end portion 40b that faces outwardly away from the respective annular flange 48a, 48b (FIG. 1). The inner diameter of ferrule 40 varies along the length of the ferrule, such as shown in FIG. 10, and includes an inboard ramped surface 52 that has a maximum diameter at its inboard end that is slightly greater than the outer diameter of each collar 44 of main body 38. Inboard ramped surface 52 decreases in the outboard direction to a smaller inner diameter that is somewhat less than the outer diameter of the collars 44. A generally constant-diameter inner surface 54 is located outboard of inboard ramped surface 52, and has an inboard diameter that corresponds to the outboard end of inboard ramped surface 52. An outboard ramped surface 56 is located outboard of constant-diameter inner surface 54, and has a minimum inner diameter that is approximately equal to, or slightly less than, the outer diameter of each outboard end portion 38a, 38b of main body 38.

Located at outboard end portion 40b of ferrule 40 is an annular convex surface in the shape of a spherical zone, which forms an outboard engagement surface 58 (FIGS. 1, 2, and 8-10) that faces the outboard direction when installed on the main body 38 of compression fitting 12 (FIGS. 1 and 2). Outboard engaging surface 58 is sized and shaped to generally correspond to the spherical zone-shaped concave engagement surface 28 of first jaw 18, such as shown in FIG. 1. Like the engagement of surfaces 28, 50, the engagement of surfaces 28, 58 permits relative movement of the first jaw 18 relative to ferrule 40, while permitting the surfaces to remain substantially engaged, similar to a ball-and-socket joint, during the pressing of the ferrule onto the fitting and fluid line.

Once ferrule 40 is fully engaged on one of the outboard end portions 38a, 38b of main body 38, such as shown at left (at end portion 38a) in FIG. 1, the inner surfaces of ferrule 40 engage or impinge on the outer surfaces (42a, 42b) of the respective outboard end portion 38a, 38b, and particularly against collars 44, so that the outboard end portions 38a, 38b are compressed or deflected radially inwardly to impinge on the outer surfaces of fluid lines 14, 16, such as in a known manner. This secures both fluid lines in the respective outboard end portions 38a, 38b of main body 38, such as shown in FIG. 2.

To install each ferrule 40 on a respective outboard end portion 38a, 38b of main body 38, a ferrule 40 is first placed on each fluid line 14, 16, such as by receiving the fluid line through the ferrule 40, which is then disposed around the fluid line and spaced from the end of the respective fluid line.

The end of the fluid line is then inserted into a respective outboard end portion 38a, 38b of the main body 38, such as indicated by a pair of straight arrows shown at right in FIG. 1. Ferrule 40 can then be grasped and manually slid along the fluid line 14, 16 until it contacts or is in close proximity to the respective outboard end portion 38a, 38b of main body 38, such as also shown at right in FIG. 1. Swage tool 10 is then positioned so that the fluid line is received in the U-shaped slot 30 of first jaw 18, and so that the middle portion 38c of main body 38 is received in U-shaped slot 30 of second jaw 20, such as shown at left in FIG. 1. Jaws 18, 20 are initially in a non-compression position with jaws 18, 20 spread relatively far apart (i.e., as if set to engage the respective surfaces 50, 58 of main body 38 and ferrule 40 at the right side of FIG. 1). Jaws 18, 20 are then squeezed together toward a compression position, as indicated by a pair of curved arrows at left in FIG. 1. The movement of the jaws 18, 20 from the non-compression position to the compression position forces ferrule 40 over outboard end portion 38a of main body 38, which compresses the outboard end portion 38a radially inwardly (and compresses or urges the raised collar 44 radially inwardly) to engage the outer surface of fluid line 14, thus securing the fluid line 14 to the compression fitting 12.

It will be appreciated that the generally spherical zone shape of the engaging surfaces 28, 50, 58 permits swage tool 10 and jaws 18, 20 to pivot in substantially any direction relative to compression fitting 12 in fluid lines 14, 16 while maintaining full engagement (or substantially full engagement) between the engaging surfaces 28 of jaws 18, 20 and the respective engaging surfaces 50, 58 of main body 38 and ferrule 40 throughout the range of motion of the jaws as they move from the non-compression position to the compression position. The larger that slots 30 are made relative to the fluid lines 14, 16 and middle portion 38c of main body 38, the more pivoting or swiveling movement is permitted between compression fitting 12 and jaws 18, 20. This facilitates a substantially even application of force along the outboard-engaging surface 58 of ferrule 40 and the inboard-engaging surface 50 of main body 38 during the pressing of the ferrule onto the fitting and fluid line, which facilitates properly-aligned installation of each ferrule 40 along a respective outboard end portion 38a, 38b of main body 38. This minimizes the risk of fluid leaks due to a misaligned ferrule, reduces the risk of kinking or buckling or bending one of the fluid lines, and allows an operator to work faster by requiring less diligence to insure that the jaws 18, 20 are perfectly aligned with the main body 38 and ferrule 40 and fluid lines 14, 16 during installation of the fitting or connector.

Numerous suitable actuation devices or mechanisms are envisioned that would be suitable for moving the jaws or jaw elements of the tool between the compression position and non-compression position. For example, a powered actuator, such as an electrically or hydraulically or pneumatically-driven actuator, may be used in place of one or two manual handles, and a control (such as a three-way switch with "open", "close", and "stop" positions) may be provided on the tool to control movement of the jaws toward and away from one another.

Figure 13:
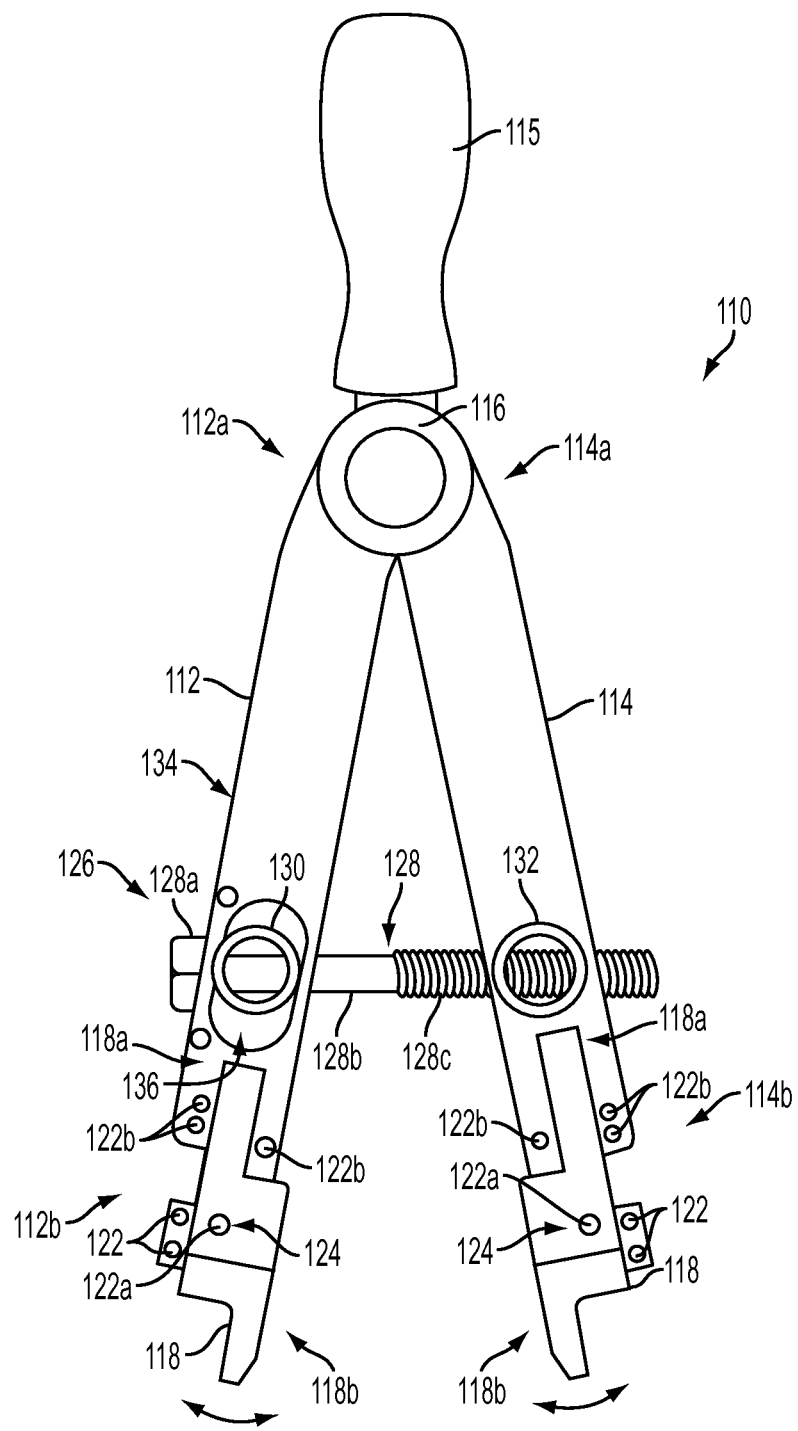
FIG. 13 is a side elevation of another swage tool in accordance with the present invention.

Referring now to FIG. 13, a swage tool 110 is configured for use in combination with a manual drive device, such as a wrench or the like, or for use in combination with a powered driver, such as an electric or pneumatic drill or wrench or the like. Swage tool 110 includes a pair of lever arms 112, 114 having respective proximal end portions 112a, 114a and distal end portions 112b, 114b. First lever arm 112 is pivotally coupled relative to second lever arm 114 via at least one pivot joint 116, such as, for example, a single pivot joint as shown in FIG. 13, located at the respective proximal end portions 112a, 114a, so that swage tool 110 is generally configured as a pair of tongs. Optionally, and as shown in FIG. 13, the proximal end portions 112a, 114a of the lever arms 112, 114 may be pivotally attached at a handle portion 115, which a user may grasp and hold during use of the swage tool 110. The lever arms may be pivotally attached at or relative to the handle portion so as to pivot about a single or common pivot axis (such as shown in FIG. 13) or may be pivotally attached at the handle portion so as to pivot about respective parallel and non-coaxial pivot axes.

Figure 15:
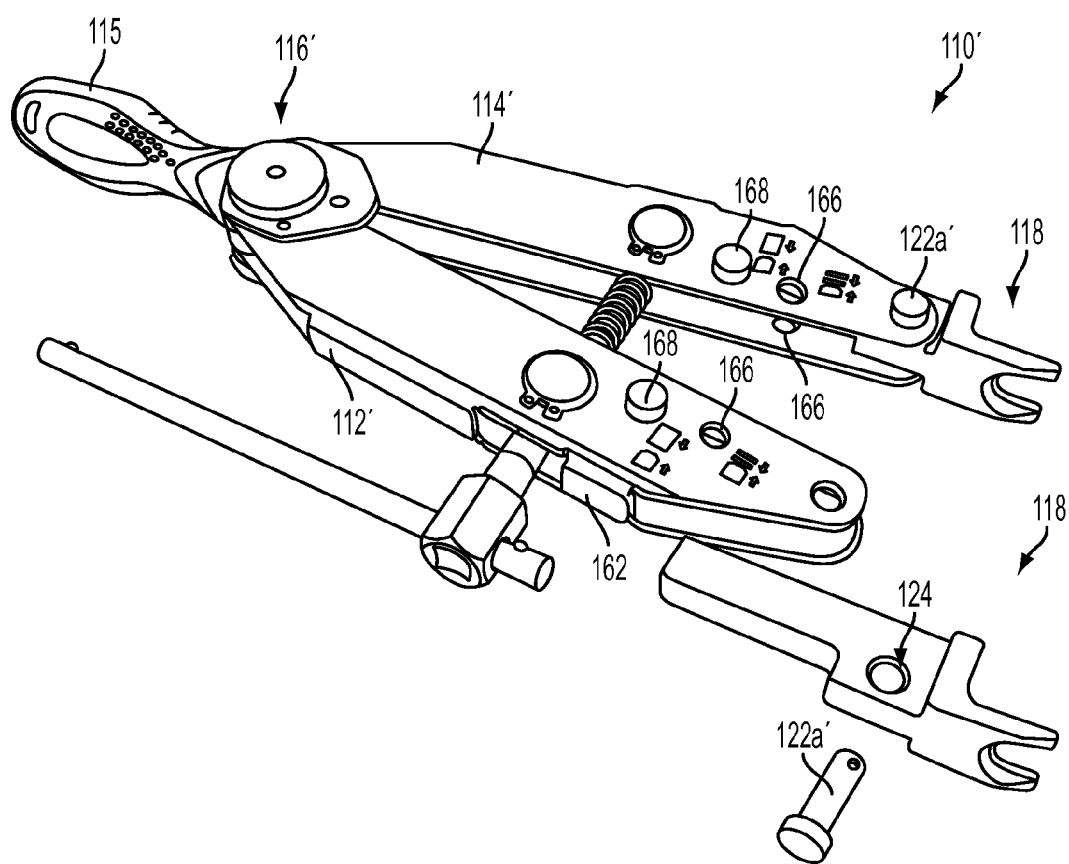
FIG. 15 is a perspective view of the swage tool of FIG. 14, with one of the jaw elements removed and shown in a reversed orientation.

The lever arms are pivotable relative to the handle and relative to one another via rotational driving of a rotational drive mechanism 126, such as a threaded cross member or element or bolt or the like, which is rotatably driven to pivot the lever arms relative to one another about the pivot joint 116, as discussed below. Each lever arm may comprise a substantially rigid metallic arm, such as an arm having a generally U-shaped cross-section with opposite side portions (such as shown in the embodiment of FIG. 15, but with only one side portion shown in FIG. 13) and a joining portion or edge portion spanning between and joining the side portions of the generally U-shaped arm. In the illustrated embodiment, the distal end portions 112b, 114b of the lever arms 112, 114 are configured to releasably and pivotally support respective jaw elements 118 (only second lever arm 114 is shown supporting a jaw element 118 in FIG. 13, but clearly both lever arms may releasably and pivotally support the respective jaw elements), which may be substantially similar to jaws 18, 20 described above, or may provide any other suitable or appropriate engagement surface shapes, depending on the particular application of the swage tool.

Optionally, different interchangeable jaw elements may be provided for attachment to lever arms 112, 114 in order to adapt the swage tool 110 for use on different styles and/or sizes of compression fittings. For example, it is envisioned that one or more sets of jaw elements may have concave bowl-shaped engagement surfaces that are generally shaped as portions of spherical zones, such as in a similar manner as described above. Other jaw elements may have one or more stepped engagement surfaces, similar to jaw elements 118, but having different dimensions and/or sizes. Optionally, one of the lever arms may be fitted with one type or size of jaw element, while a different type or size of jaw element is fitted to the other lever arm, in order to permit the swage tool to be used on compression fittings having differently-shaped engagement surfaces at the ferrule and the main body, respectively.

Distal end portions 112b, 114b of lever arms 112, 114 are configured to pivotally receive or support or attach to the respective jaw element 118. For example, the lever arms may comprise a pair of spaced apart arm portions or side walls of the lever arm that receive a jaw element therebetween at the distal end portion. The distal end portions 112b, 114b include a plurality of posts or pins 122 for supporting or retaining jaw elements 118 thereat (and for spacing the side walls of the lever arm and providing enhanced rigidity to the lever arm), with one of the posts or pins comprising a central pivot post 122a for engaging a bore 124 in jaw element 118, and with at least one of the remainder of posts 122b stabilizing and supporting jaw element 118 against substantial movement relative to lever arms 112, 114 during use of the tool 110 (while allowing for limited pivotal movement of the jaw elements, about pivot post 122a, relative to the ends of the lever arms). It is envisioned that various different permanent or temporary attachment devices or methods may be used to couple or join the jaw elements to the respective lever arms, or the jaw elements may be unitarily formed with the lever arms, without departing from the spirit and scope of the present invention. In the illustrated embodiment of FIG. 13, central pivot post 122a may function to pivotally mount or attach or retain the jaw element 118 at the distal end portion of the tool so that the jaw elements may pivot relative to the tool lever arms during operation of the tool to maintain general alignment with the fitting that is disposed between or at the jaw elements. One or more of the stabilizing and supporting posts 122b may be received through one or more apertures in the lever arm to limit pivotal movement of the jaw element in either or both directions relative to the lever arm during operation of the tool.

Lever arms 112, 114 are pivotable about at least one pivot joint or axis 116 (such as at handle 115) between a compression position and a non-compression position, such as via an actuation mechanism or rotational drive mechanism 126 that is disposed at or connected at the lever arms and positioned between the proximal and distal end portions of the lever arms. Actuation mechanism 126 includes a threaded shaft or bolt 128 extending between first lever arm 112 and second lever arm 114, and a pair of bolt-receiving members or pivot mounts 130, 132 disposed transversely in the respective lever arms 112, 114 (such as within the generally U-shaped arms and between the side walls of the U-shaped arms, with a mounting portion or pin of the pivot mounts protruding through holes in the respective side walls of the arms to pivotally attach the pivot mounts at the arms). In the illustrated embodiment, bolt 128 includes a head portion 128a that projects outwardly from an outboard surface or portion 134 of first lever arm 112, a generally smooth or non-threaded shaft portion 128b that extends from head portion 128a through first lever arm 112 and first bolt-receiving member 130, and a threaded shaft portion 128c that extends through second lever arm 114 and threaded second bolt-receiving member 132.

In the illustrated embodiment of FIG. 13, bolt-receiving members 130, 132 are pivotally mounted at or attached at or disposed at the respective lever arms 112, 114 (such as via a generally tubular or cylindrical mounting portion being at least partially received in or through an aperture or recess of the respective lever arm, such as between the opposite side portions of the generally U-shaped arm), with the bolt-receiving members 130, 132 having pivot axes that are generally transverse or perpendicular to the longitudinal axes of the respective lever arms 112, 114 in which the bolt-receiving members are mounted. Each bolt-receiving member 130, 132 defines a passageway or opening for receiving the shaft portions of the bolt 128. The passageway or opening in first bolt-receiving member 130 is sufficiently large so that shaft portions 128b, 128c can readily pass through, but sufficiently small so that head portion 128a cannot. The passageway or opening in second bolt-receiving member 132 is threaded so as to be threadedly engaged by threaded shaft portion 128c of bolt 128. Each of the bolt-receiving members may comprise any suitable configuration, such as, for example, a generally tubular or barrel shaped member that has its ends or end portions at least partially received at or in or through respective portions of the respective lever arm, with a threaded or non-threaded passageway formed transversely through the barrel shaped member for receiving the respective portion of the bolt. The threaded shaft portion 128c of bolt 128 may comprise a substantial portion of the shaft of the bolt so that, when the lever arms are pivoted to their fully closed position (where the lever arms are generally parallel to one another and may abut against one another or almost abut against one another), the threaded shaft portion 128c is engaged with the threaded bolt-receiving member 132. The threaded shaft portion 128c may have the same or smaller outside diameter as the non-threaded shaft portion 128b, so that when the tool is at least partially opened (the lever arms are pivoted away from one another), the lever arms may be manually squeezed together, whereby the first bolt-receiving member 130 may slide along the non-threaded shaft portion and the threaded shaft portion to manually close or partially close the jaws together.

Optionally, other threaded elements may be implemented to rotatably drive the levers towards and away from one another. For example, a threaded element having opposite threads at opposite portions thereof (such as a right hand thread at one half of the threaded element and a left hand thread at the other half of the threaded element) may be disposed through the lever arms and may be threadedly engaged with a pivot element at each lever arm, whereby rotation of the threaded element in one direction causes the arms to move towards the center of the threaded element and rotation of the threaded element in the other direction causes the arms to move away from the center of the threaded element. In such an application, the drive portion of the threaded element may be at either end of the threaded element or even at a central portion of the threaded element. In such an application, the tool would not include the ability to manually slide one of the arms along the threaded element since the threaded element would threadedly engage both of the bolt-receiving members at the lever arms.

Thus, bolt 128 is rotatable or rotatably operable or driven to draw second lever arm 114 toward or away from first lever arm 112 via the threaded engagement with the bolt-receiving member 132 and the non-threaded engagement through bolt-receiving member 130. Thus, rotation of the bolt in one direction (such as a clockwise direction) functions to draw the bolt-receiving member 132 (and lever arm 114) towards the bolt-receiving member 130 (and lever arm 112), while rotation of the bolt in the opposite direction (such as in the counterclockwise direction) urges or moves the bolt-receiving member 132 (and lever arm 114) away from the bolt-receiving member 130 (and lever arm 112). The rotation of the bolt head and bolt may be accomplished via any suitable means. For example, a power tool, such as a power drill or wrench or the like, or a manual tool, such as a wrench or T-bar or the like, may be engaged with head portion 128a of bolt 128 to rotate the bolt and cause second bolt-receiving member 132 (and second lever arm 114) to move along threaded shaft portion 128c of the bolt and towards or away from the first bolt-receiving member 130 and lever arm 112. Optionally, a rod or arm may be inserted through the bolt head (such as shown in FIG. 15) to allow for a user to readily rotate the bolt head to open and close the tool. The rod may be removable from the bolt head if desired, so as to allow for use of a wrench or socket or power driver or the like.

Bolt-receiving members 130, 132 may be pivotable or rotatable about their respective pivot axes (such as axes that are generally normal or transverse to the longitudinal axis of the respective lever arms) to compensate for the change in angle between the lever arms 112, 114 as they move between the compression and non-compression positions. The lever arms are thus movable relative to the handle and relative to one another between the compression and non-compression positions via rotation of a threaded cross member that is pivotally mounted at each of the lever arms. The pivotal mounting of the cross members at the lever arms provides self-aligning pivot mounts for the threaded cross member, thereby limiting or substantially precluding binding of the threaded cross member as it is rotated to move the lever arms between their compression and non-compression positions. Optionally, one of the bolt-receiving members (such as first bolt-receiving member 130 in FIG. 13) may be positioned in and/or movable along a longitudinal slot 136 in first lever arm 112, which enables the bolt-receiving member 130 (and head portion 128*a* and smooth shaft portion 128*b* of bolt 128) to move at least slightly along the first lever arm 112 in its longitudinal direction during operation of the tool, also to compensate for the change in angle between the lever arms as they move between the compression and non-compression positions.

Optionally, swage tool 110 may incorporate a spring or other biasing element for urging lever arms 112, 114 apart as bolt 128 is rotated in the direction corresponding to moving the lever arms 112, 114 and jaws 118 apart toward the non-compression position. Such a spring or biasing element (such as a coil spring) could be provided in pivot joint 116 (such as at an attachment or mounting portion of the handle 115), or a leaf spring could be disposed inside of the lever arms at their proximal end portions 112*a*, 114*a*, or any other suitable biasing element could be positioned substantially anywhere between lever arms 112, 114. For example, a coil spring may be disposed along bolt 128 between the bolt-receiving members and held in compression along bolt 128 between the lever arms, whereby the spring is compressed when the lever arms are drawn towards one another and thus biases the lever arms towards their open or spaced apart position. Thus, when the lever arms are manually squeezed together (where the first bolt-receiving member may slide along the shaft of the bolt) and then released, the biasing element or spring will urge the lever arms towards their spaced apart or at least partially opened position relative to one another.

Thus, when a ferrule or fitting or other article configured for engagement by the tool is positioned at and between jaw elements 118, a rotational drive device may be drivably connected at bolt head portion 128*a* (such as via a socket of the drive device receiving the bolt head portion or the bolt head portion receiving a drive element or the like) and the device may be actuated or manipulated to rotatably drive (either manually or via a power driving device) the bolt to draw the lever arms together, thereby moving the jaw elements 118 and the ferrules 40 toward the middle portion 38*c* of the compression fitting's tubular main body 38 when used for the fluid line coupling described above. As the lever arms and jaw elements are drawn together, the lever arms pivot about their pivot connection at handle 115, and the bolt-receiving members rotate or pivot to maintain alignment of the passageways of the bolt-receiving members to limit or substantially preclude binding of the bolt during such operation, and the jaw elements may also pivot to maintain alignment of the jaw elements with the coupling or other article received or positioned at the jaw elements. The swage tool thus may provide multiple pivot joints or pivots that cooperate to provide enhanced and controlled actuation of the tool to move the jaws in a controlled manner during use of the tool. The rotational drive system or mechanism of the swage tool of the present invention provides such enhanced and controlled actuation of the tool while also facilitating a smaller sized tool that is capable of achieving the high compression or clamping forces that may be necessary to clamp or compress the fitting together.

In the illustrated embodiment, the lever arms 112, 114 are pivotally connected together at their proximal ends 112*a*, 114*a* at handle 115 and the threaded cross member or bolt 128 is pivotally mounted at the lever arms (such as at or near a generally central region of the lever arms between their proximal and distal ends) and the jaws are pivotally mounted at the distal ends of the lever arms, such that the tool has a plurality of pivots or pivot joints that cooperate to maintain alignment of the jaws with the compression fitting. For example, the tool may include at least three pivots, including the pivotal connection of the proximal ends of the lever arms at the handle, the pivotal mount for the threaded cross member at one of the lever arms, and the pivotal mount of one of the jaws at one of the lever arms. Preferably, and in the illustrated embodiment, the tool includes at least five pivots or pivot joints (the pivotal connection of the lever arms at the handle, the pivotal mounts for the threaded cross member at each lever arm, and the pivotal mounts of the jaws at each lever arm) that cooperate to maintain substantial alignment of the ferrule-engaging surface and body-engaging surface of the jaws with the barrel-shaped ferrule and main body of the compression fitting, throughout the range of pivotal movement of the arms between the compression and non-compression or open positions.

Optionally, it is envisioned that the pivot joint or joints at the proximate end of the lever arms may allow for lateral movement (in a direction generally along the direction of the pivot axis) or adjustability of the lever arms to provide a further degree of freedom to enhance the alignment of the jaws with the fitting or the like. Optionally, it is also envisioned that the jaw or jaws may attach at the ends of the lever arms in such a manner that allows for some side to side movement or adjustability of the jaws (in a direction generally along the pivot axes of the pins that attach the jaws to the lever arms) to provide a further degree of freedom to enhance the alignment of the jaws with the fitting or the like.

Thus, a user may grasp and hold the tool 110 (such as at the handle 115, if applicable) with one hand and may readily align the jaws with a compression fitting or the like, such as via adjusting the degree of opening of the tool and adjusting the pivot angle of the jaws relative to the lever arms and even adjusting the lever arms and/or jaws laterally, so as to properly align the jaws with the fitting and to engage the jaws with the engagement surfaces of the fitting or the like. After positioning and aligning the compression fitting or the like at and between the jaws, the user may rotate the threaded cross member with another hand (or via a tool or drive tool or the like) to draw the jaws together to engage and compress the fitting, while the lever arms pivot relative to the handle and one another and the threaded cross member pivots relative to the lever arms, and the jaws pivot relative to the lever arms, thereby enhancing control and alignment of the jaws relative to the compression fitting or the like that is being compressed by the swage tool. Optionally, after the jaws are positioned generally at the compression fitting or the like, an operator may begin a swaging operation by manually squeezing the lever arms together, causing first lever arm 112 and its pivot mount 130 to slide along shaft 128 until the jaw elements 118 contact the compression fitting at the appropriate engagement surfaces. The operator may then more easily or readily rotate the shaft 128 until it is threaded into the second bolt-receiving member sufficiently so as to hold the lever arms in place without need for manually holding or squeezing the lever arms, at which point further rotation of shaft 128 will move the ferrule(s) onto the main body of the compression fitting.

The pivotal attachment of the lever arms at the handle further enhances the tool's ability to adapt and maintain alignment of the jaws, even if the user has to hold the handle at an angle during use of the tool, such as may be necessitated by tight clearances in areas where the compression fitting may need to be installed or implemented. The swage tool of the present invention thus provides multiple degrees of freedom and pivots between the handle and the engaging surfaces of the jaws, in order to enhance and maintain the alignment of the engaging surfaces of the jaws with the compression fitting or the like disposed therebetween, during operation and use of the swage tool.

As shown in FIG. 13, jaw elements 118 have respective proximal end portions 118a that are received between the stabilizing and supporting posts 122b when the jaw elements are mounted to their respective lever arms 112, 114 of swage tool 110. Jaw elements 118 further include respective distal end portions 118b that project outwardly from the distal end portions 112b, 114b of the lever arms 112, 114. Distal end portions 118b define respective U-shaped openings or slots 138 for receiving a ferrule 140 and a main body 142 of a compression fitting 144 (FIGS. 23-26), which operates in a similar manner as the compression fitting 12 to join respective fluid lines 14, 16, and which will be described in more detail below.

Figure 18:
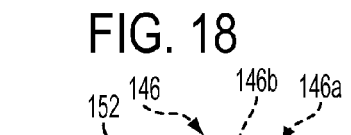
FIG. 18 is an enlarged end sectional elevation of the jaw element, taken along section line XVIII-XVIII in FIG. 17.
Figure 19:
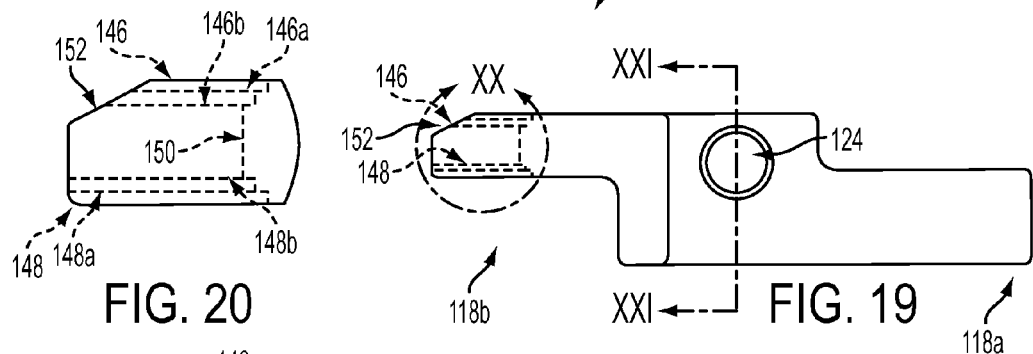
FIG. 19 is a side elevation of the jaw element of FIG. 16.
Figure 20:
FIG. 20 is an enlarged view of the region designated XX in FIG. 19.
Figure 22:
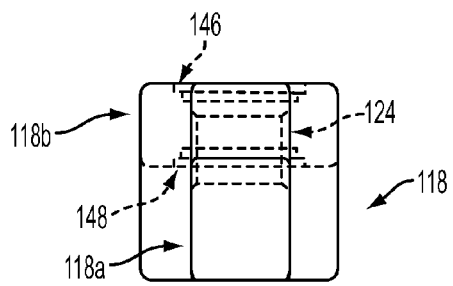
FIG. 22 is a rear elevation of the jaw element of FIG. 16.
Figure 21:
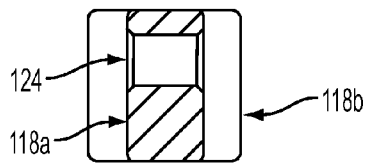
FIG. 21 is an end sectional elevation of the jaw element, taken along section XXI-XXI in FIG. 19.

Optionally, and as shown in FIGS. 16-22 and 25, jaw elements 118 have U-shaped openings 138 that are defined by a plurality of stepped engagement surfaces including a set of inboard stepped engagement surfaces 146 and a set of outboard stepped engagement surfaces 148. As best shown in FIG. 18, inboard stepped engagement surfaces 146 include an outer engaging wall 146a and a parallel inner engaging wall 146b, with the outer engaging wall 146a spaced outwardly and outboard of inner engaging wall 146b, and with a step wall 146c that is positioned between the engaging walls 146a, 146b and acting as a perpendicular "riser". Similarly, and on the other side of distal end portion 118b from inboard stepped engagement surfaces 146, outboard stepped engagement surfaces 148 include an outer engaging wall 148a and a parallel inner engaging wall 148b, with the outer engaging wall 148a spaced outwardly and outboard of inner engaging wall 148b, and with a perpendicular step wall 148c that is positioned between the engaging walls 146a, 146b to act as a riser between the engaging walls. A generally U-shaped inner surface 150 is positioned inboard of the inner engaging walls 146b, 148b and defines the narrowest region of U-shaped opening 138. The U-shaped openings 138 are configured to permit positioning of the jaw elements along the fluid line (adjacent the ferrule) and the main body of the compression fitting, and to permit removal of the fluid line, ferrule, and main body from the jaw elements following the swaging operation. Optionally, one side of distal end portion 118b includes a beveled region 152 that intersects the inboard stepped engagement surfaces 146 to facilitate engagement with the main body 142 of compression fitting 144, as will be described below.

Referring now to FIGS. 23-26, the compression fitting's ferrule 140 has a set of outboard stepped engagement surfaces 154 and main body 142 has four sets of stepped engagement surfaces including two sets of inboard stepped engagement surfaces 156 and two sets of outboard stepped engagement surfaces 158, as best shown in FIG. 26. In all other respects, aside from the use of stepped engagement surfaces on compression fitting 144, the compression fitting 144 is substantially similar to compression fitting 12, such that the various surfaces and the general operation of compression fitting 144 may be readily understood with reference to the above descriptions for compression fitting 12. In addition, the stepped engagement surfaces 154, 156, 158 have similar dimensions as the stepped surfaces 146, 148 at the distal end portion 118b of each jaw element 118, except that the stepped engagement surfaces 154, 156, 158 of compression fitting 144 are substantially annular in shape, rather than U-shaped. Moreover, the spacings between the surfaces of the stepped surfaces 156 and 158 are sized so as to generally correspond to the width or dimension between the opposite surfaces of the engagement surfaces of the distal end portions of the jaw elements 118, such that the jaw element, when engaging the main body of the compression fitting, has its engagement surfaces received in between and contacting both of the engagement surfaces 156, 158.

As shown in FIG. 25, when distal end portions 118b of the jaw elements 118 are engaged with compression fitting 144, one of the jaw elements engages main body 142 and the other jaw element engages ferrule 140. For the jaw element that engages ferrule 140 (at left in FIG. 25), it is the inboard stepped engaging surfaces 146 that engage the outboard stepped engagement surfaces 154 of ferrule 140 as fluid line 14 (and the engaging surfaces 154 of ferrule 140) is received in the U-shaped opening 138 of that jaw element. For the jaw element that engages main body 142 (at right in FIG. 25), it is the inboard stepped engaging surfaces 146 that engage the outboard stepped engagement surfaces 158 of main body 142, while the outboard stepped engaging surfaces 148 of that jaw element engage (or are in close proximity to) the inboard stepped engaging surfaces 156 of main body 142, which is received in the U-shaped opening of the jaw element.

Inner surface 150 of the jaw element engages main body 142 at a smooth outer surface portion 160 (FIG. 26), which extends between opposing sets of inboard stepped engaging surfaces 156 and outboard stepped engagement surfaces 158. Beveled region 152 of each distal end portion 118b aids insertion of the jaw element between opposing sets of inboard stepped engaging surfaces 156 and outboard stepped engaging surfaces 158, which are spaced apart by a distance that is approximately the same as (or slightly greater than) the thickness of distal end portion 118b at the inboard (curved) regions of stepped engaging surfaces 146, 148.

The engagement of outboard stepped engaging surfaces 148 (of the jaw element that receives main body 142) with the inboard stepped engaging surfaces 156 of main body 142 also facilitates removal of the jaw elements 118 from the compression fitting 144 after it has been attached to one or both of the fluid lines 14, 16, since outboard stepped engaging surfaces 148 will engage the inboard stepped engaging surfaces 156 when the jaws are spread apart (opposite the direction of the arrows in FIG. 25), thereby providing a surface against which the jaw will act against so as to disengage the outboard jaw element from ferrule 140.

The use of stepped engagement surfaces in the jaw elements 118 and the compression fittings 144 helps to secure the compression fitting in the jaws and may increase the contact area while facilitating proper alignment of the jaw elements 118 relative to the compression fitting's ferrule 140 and main body 142, at the same time that the ability of each jaw element 118 to pivot at least slightly relative to the lever arms 112, 114 also facilitates proper alignment of the compression fitting as it is held loosely in the jaws of the swage tool 110, prior to the application of substantial compressive forces as described above.

Optionally, at least one of the ferrule-engaging surface and the body-engaging surface of the jaw or jaws may be generally shaped as a spherical zone surface or partially spherical or rounded surface for engaging a respective one of the ferrule and the main body of the compression fitting, such as described above. The ferrule and body of the compression fitting maintain consistent or even contact along the corresponding engagement surfaces during the pressing of the ferrule onto the fitting and fluid line. Thus, such spherical zone surfaces and engagements further enhance and maintain the alignment of the engaging surfaces of the jaws with the compression fitting or the like disposed therebetween, during operation and use of the swage tool.

Figure 14:
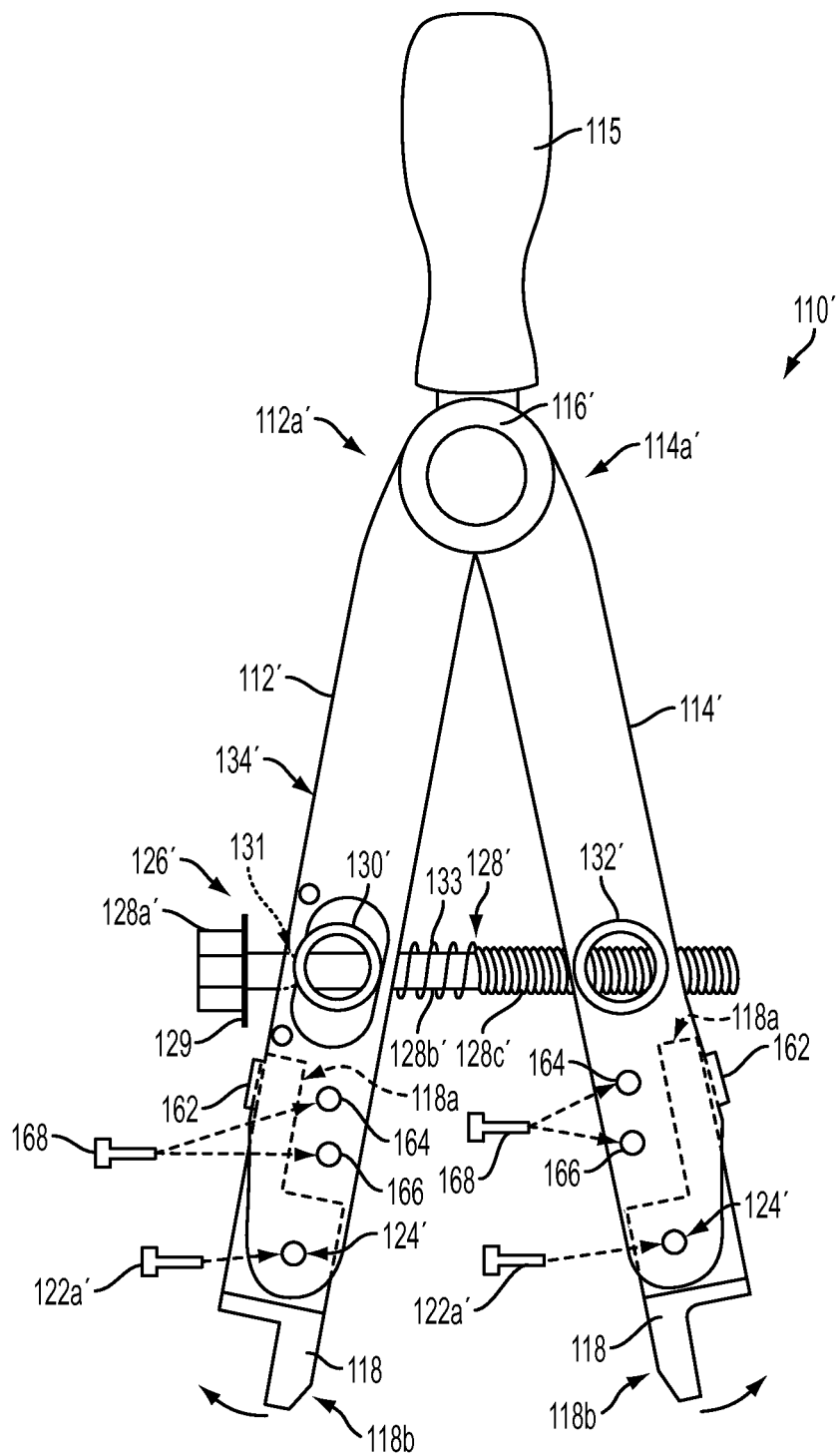
FIG. 14 is a side elevation of another swage tool in accordance with the present invention.

Referring now to FIGS. 14 and 15, another swage tool 110' is similar in many respects to swage tool 110 of FIG. 13, such that comparable or identical components are referenced with similar numerals in FIG. 14. For example, the operation of lever arms 112', 114' and rotational drive mechanism 126' of the swage tool 110' is substantially the same for both tools, and may be readily understood with reference to the above descriptions, such that only the main differences found in swage tool 110' will now be described.

Rotational drive mechanism 126' includes a biasing element 133 (shown in the form of a coil spring) for urging lever arms 112', 114' apart from one another as the bolt 128' is rotated in the direction corresponding to moving the lever arms 112', 114' and jaw elements 118 apart toward the non-compression position. Head portion 128a' of bolt 128' is configured for engagement by a tool such as an open or closed wrench, a hex key wrench, a powered drill or wrench, a hand crank (FIG. 15) or the like, such as in a similar manner as head portion 128a, discussed above. Head portion 128a' includes a flange 129 at a base region of the head portion (such as partially around the base region of the head portion or fully circumscribing the base region of the head portion) to provide a stop or ledge so as to prevent a tool (e.g., a manual or powered wrench, crank arm, or the like) from slipping past the head portion during rotational driving of the bolt 128'. Bolt 128' includes a shoulder 131 where the generally smooth or non-threaded shaft portion 128b' transitions to a larger diameter region near head portion 128a'. Beginning at shoulder 131, the larger diameter region of the non-threaded shaft portion 128b' is sufficiently large so as not to pass through the first bolt-receiving member 130', and so that head portion is spaced outwardly from first lever arm 112' even when spring 133 biases the first lever arm 112' away from second lever arm 114' to the maximum extent permitted by drive mechanism 126' (where the shoulder 131 engages the bolt-receiving member 130').

First and second lever arms 112', 114' have respective distal end portions 112b', 114b' that form respective channels or receiving portions in which the proximal end portions 118a of jaw elements 118 are received. The jaw elements 118 may be partially received in the receiving portions and pivotally mounted thereat (or optionally fixedly mounted or disposed or established thereat). For example, a pivot pin 122a' may be received through each jaw element 118 at bore 124' and through aligned bores through the side walls of the generally U-shaped lever arms to pivotally mount or attached the jaw element at the respective lever arm. Each lever arm 112', 114' includes an outboard stop element or surface 162 (which may be an element disposed at the outer wall of the lever arm or may be the outer wall of the lever arm, such as at an aperture formed through the outer wall of the lever arm) that is engaged by the proximal end portion 118a of the respective jaw element 118 when the proximal end portion 118a is pivoted outwardly as shown in FIG. 14 (with the distal end portion 118 of the jaw 118 pivoted inwardly).

Optionally, and desirably, the jaws may be pivotally mounted at the ends of the lever arms and the lever arms may have pivot limiting means or elements for selectively limiting pivotal movement of the jaws relative to the lever arms, such as when the tool is used on different sized fittings or the like. For example, a pivot stop or pin 168 may be inserted into a selected hole or aperture in the lever arm to set a stop position for the jaw at a desired degree of outward pivoting of the jaw relative to the lever arm. In the illustrated embodiment of FIGS. 14 and 15, each lever arm 112', 114' has a first bore 164 for selectively receiving the pivot stop 168 to limit the maximum pivoting extent of jaw element 118 (in the direction of curved arrows in FIG. 14) to a first position, and a second bore 166 for selectively receiving the pivot stop 168 to limit the maximum pivoting extent of jaw element 118 to a second position. The pivot stop or pin 168 is selectively and removably positionable in first bore 164 to limit jaw element 118 to pivoting only so far as the first position, at which point the proximal end portion 118a will contact the pivot-stop pin 168 in first bore 164 as the jaw element pivots away from the position shown in FIG. 14 (in other words, as the jaw element at first lever arm 112' pivots clockwise, and the jaw element at second lever arm 114' pivots counterclockwise). The same pivot stop 168 is alternately selectively positionable in second bore 166 to limit jaw element 118 to pivoting only so far as the second position, at which point the proximal end portion 118a will contact the pivot-stop pin 168 in second bore 166 as the jaw element pivots away from the position shown in FIG. 14, and also beyond the first position corresponding to first bore 164.

Figure 15A:
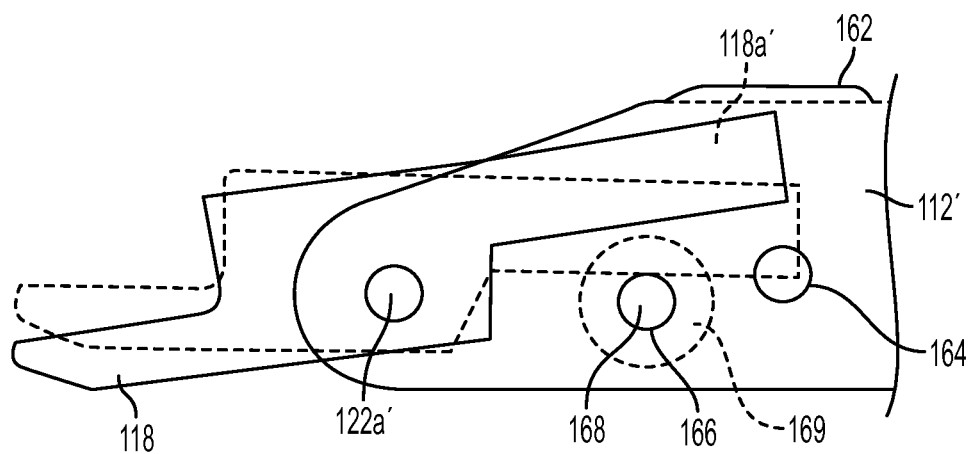
FIG. 15A is an enlarged side elevation of the swage tool of FIGS. 14 and 15, showing adjustment of the jaw element at the end of the lever arm.
Figure 16:
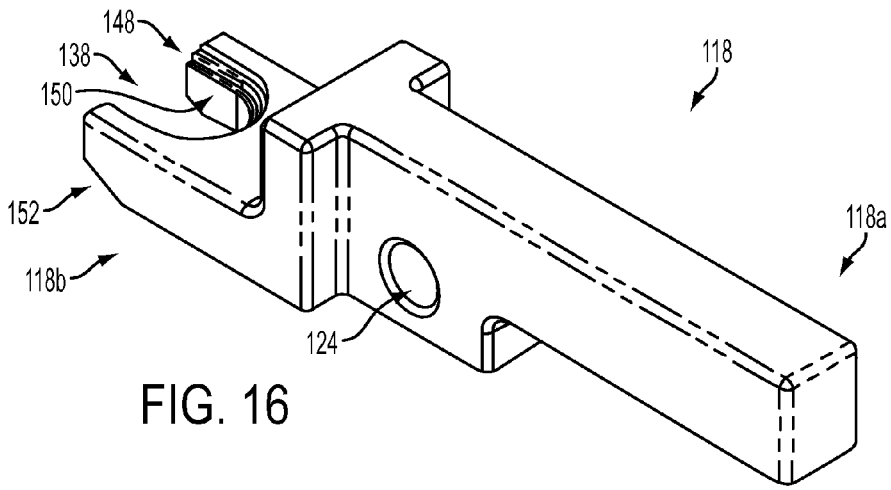
FIG. 16 is a perspective view of a removable jaw element configured for use with the swage tools of FIGS. 13-15.
Figure 17:
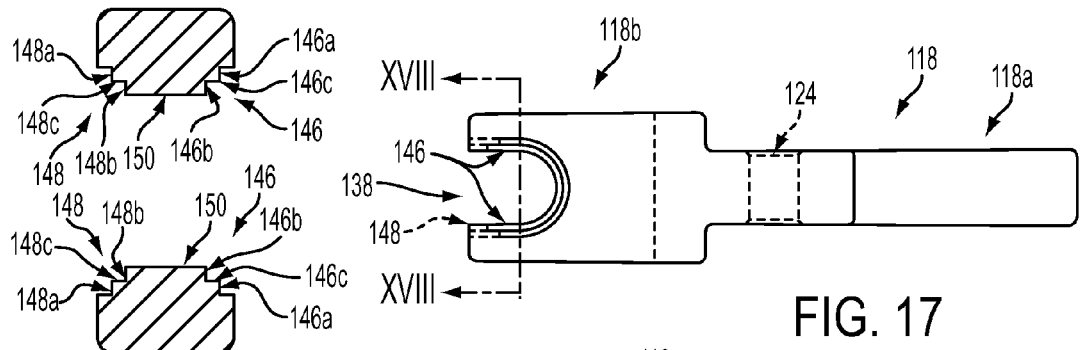
FIG. 17 is a bottom plan view of the jaw element of FIG. 16.

As best shown in FIG. 15A, when the jaw 118' is pivoted to its inward most pivot location (with the end portion 118a' of the jaw element contacting the stop element 162), the jaw is pivoted relative to the lever arm so that the engaging portion of the jaw is angled towards the other lever arm and other jaw. Thus, the engaging portions of the jaws may be generally parallel when the lever arms are opened wider. When the jaw is pivoted to one of its inward pivot locations or orientations, such as when the jaw portion 118a' contacts pivot stop 168 (as shown in phantom in FIG. 15A), the jaw pivots outward, whereby the engaging portions of the jaws may be generally parallel when the lever arms are closer to their closed positions or orientation.

It will be appreciated that the ability to limit the maximum pivoting extent of jaw elements 118 with the position of pivot stops or pins 168 allows an operator to adapt the swage tool 110' for better alignment and increased engagement surface contact area when using the tool on compression fittings having different lengths, or when using the swage tool to either join a single ferrule to the main body of a compression fitting, or to simultaneously join two ferrules at opposite ends of the fitting's main body, which requires that the lever arms 112', 114' be spaced further apart. For example, for a single ferrule fitting or a smaller fitting, the pivot stops 168 may be disposed in bores 166 to allow for further outward pivoting of the jaw elements as the arms are drawn closer to one another, whereas, for a double ferrule fitting or a larger fitting, the pivot stops 168 may be disposed in bores 164 to further limit outward pivoting of the jaw elements so that they remain closer to proper alignment during the process of pressing the ferrule onto the fitting body (and are prevented from pivoting outward beyond alignment with the fitting during the pressing process). Thus, permitting adjustment of the maximum pivoting extent of the jaw elements 118 in this manner allows an operator to properly align and set or seat the engagement surfaces of the jaw elements with two ferrules, or with one ferrule and the center of the main body, or with compression fittings of different lengths, prior to tightening or closing the lever arms 112', 114' to the compression position. Optionally, additional bores may be provided in lever arms 112', 114' to limit the range of pivoting motion of each jaw element at different degrees of pivotal movement, as desired.

Pivot stops 168 and pivot pins 122a' may be substantially identical to one another, and in the illustrated embodiment, are sized to pass through two bores of the respective lever arm (which may comprise a generally U-shaped metal arm having opposite sides with the bores formed therethrough) in coaxial alignment and corresponding to each of first bore 164, second bore 166, or to another bore in each lever arm that is aligned with pivot bore 124. Pivot stops or pins 168 and pivot pins 122a' have a shaft with a head portion at an end thereof, and each may include a spring-ball detent at a distal end of the shaft from the head (such as shown in FIG. 15) for removably securing each pin in its bores, but in a manner that permits an operator to readily remove each pin in order to change the maximum pivoting extent of each jaw element, or to change the orientation of the jaw element, or to replace the jaw element with one of a different size and/or configuration. Optionally, the pivot pin 122a' and the pivot stop or pin 168 may comprise respective legs of a unitary or generally U-shaped pin, with the legs being spaced apart to align with the appropriate bores (so that the tool may include one U-shaped pin with legs that align with bores 124' and 166 and another U-shaped pin with legs that align with bores 124' and 164), while remaining within the spirit and scope of the present invention.

Optionally, a spacing element 169 (FIG. 15A) may be provided at the pin 168 that, when the pin is inserted through the bores and through the spacing element (which may be disposed between the side walls of the generally U-shaped lever arm), the spacing element (such as a disc that receives the pivot stop or pin therethrough when the pivot stop is inserted through the bores of the lever arm) engages the end portion 118a' of the jaw to hold the jaw at or near its inward pivoting limit to assist in aligning the jaws with the fitting, particularly for larger fittings. Optionally, the tool, such as the lever arm, the pivot pin or the jaw, may function to urge or bias the jaw towards its inward pivoting limit (where the jaw may contact the outboard stop element 162). For example, a torsional spring or the like may be disposed at the jaw to urge the jaw to pivot inwardly such that the end portion 118a' of the jaw 118' engages the outboard stop element 162. As the jaw is engaged with and pressed against the fitting or ferrule, the force at the jaw will overcome the biasing force of the spring to allow the jaw to pivot to maintain alignment during the compression process.

Although shown and described above as being used as a coupling tool for various sized and shaped compression fittings for coupling fluid lines, it is envisioned that the swage tool 110, 110' may be used as a coupling tool for completing other types of fluid line connections or clamping applications, such as for connecting a flexible fluid line 60 to a fluid coupler 62 having a hose barb portion 64 (FIG. 11) that is inserted into an end portion of a fluid line. In the illustrated embodiment, a fluid line gripper and stabilizer 66 is used to securely hold a fluid line 60 during insertion of a fluid coupler 62, while limiting or preventing undesired buckling or bending of the fluid line 60 due to the axial loads applied at the end of the fluid line during insertion of the hose barb portion 64 of fluid coupler 62. Fluid line stabilizer 66 includes a line holding or clamping portion 68, which has an inner passageway having a diameter that is the same or slightly smaller than the outer diameter of flexible fluid line 60. This permits gripping of the fluid line 60 by the smaller inner diameter clamping portion 68 of fluid line stabilizer 66. Optionally, the inner surface or passageway of the clamping portion 68 may have a knurled or textured surface to aid in gripping the outer surface of fluid line 60 when the fluid line stabilizer is applied at the fluid line and substantially retained or clamped thereat.

Figure 11:
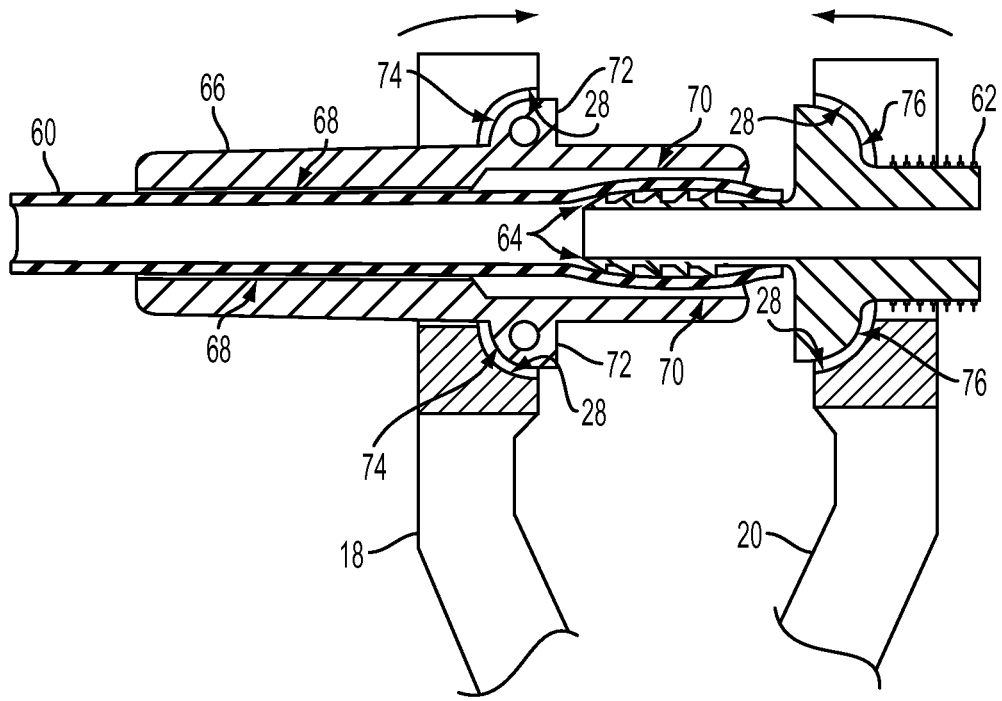
FIG. 11 is a side sectional view of the jaws of a swage tool shown engaging a fluid line stabilizer and installing a fluid fitting into a fluid line.

Fluid line stabilizer 66 further includes, at its inboard end portion, a guide or stabilizer portion 70 having a larger passageway that has a larger inner diameter than the normal outer diameter of fluid line 60. The fluid line stabilizer 66 is configured to be clamped or secured at the fluid line, with the fluid line substantially clamped or retained within the clamping portion 68 and with an end portion of the fluid line extending at least partially along the larger diameter guide or stabilizer portion 70. The larger diameter portion provides a space between the fluid line and the inner wall of the portion 70 and thus permits some radial expansion of the fluid line 60 upon insertion of hose barb portion 64 of fluid coupler 62, such as shown in FIG. 11. Larger inner diameter region 70 may be somewhat larger than the expanded outer diameter of fluid line 60, as shown, or may be approximately equal to the expanded outer diameter of fluid line 60, or even slightly smaller than the normal expanded outer diameter of fluid line 60, to provide increased support for the fluid line as the hose barb portion 64 of fluid coupler 62 is inserted into the fluid line 60. Thus, fluid line stabilizer 66 grips and supports a portion of the fluid line 60 during insertion of the hose barb portion 64 of fluid coupler 62, to limit or prevent buckling or bending of the fluid line during attachment of the fluid coupler 62.

Figure 12:
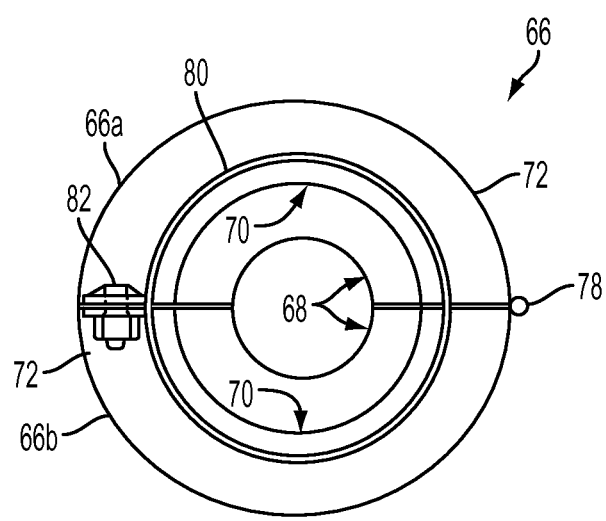
FIG. 12 is an end elevation of the fluid line stabilizer of FIG. 11.

Fluid line stabilizer 66 comprises two portions or halves 66a, 66b that are coupled together, such as via a clamp that circumscribes the assembled stabilizer to hold the stabilizer at the fluid line (via the clamping of the smaller diameter clamping portion at the fluid line). The two portions may be readily aligned with one another via one or more pins that function to generally retain the portions together and to make sure that they are properly aligned with one another along the fluid line. The clamp may comprise any suitable clamping device, such as a ring type clamp or hinge clamp or tie strap or the like that is disposed around the clamping portion and tightened to clamp the clamping portion onto the fluid line. Optionally, and as shown in FIG. 12, the two halves or portions may be pivotally coupled together via a hinge 78 at one side. A clamp band 80 with fastener 82 may be provided along the outer surface of the stabilizer 66 for holding the halves 66a, 66b together in tight engagement with fluid line 60. To remove the fluid line 60 from fluid line stabilizer 66 (such as after the hose barb end of the coupler is pressed into the fluid line and fully seated in the fluid line), the fastener 82 is loosened or removed to at least loosen the clamp band 80, and the halves 66a, 66b are moved or pivoted apart at least slightly. It is envisioned that substantially any type of clamping or fastening arrangement may be used to hold the fluid line stabilizer halves 66a, 66b together for stabilizing fluid line 60 during insertion of the fluid coupler 66, while remaining within the spirit and scope of the present invention.

In the illustrated embodiment, fluid line stabilizer 66 includes an annular flange 72 for engaging a jaw member or element of a compression tool or the like. The fluid coupler 62 may comprise a suitable surface or portion for engagement with another jaw member of a compression tool or the like, whereby the tool may be actuated to press or urge or move the hose barb portion of the fluid coupler into the end portion of the fluid line that is disposed at the larger diameter guide portion 70 of the fluid line stabilizer 66. As the hose barb portion is inserted into the hose, the larger diameter guide portion 70 guides and stabilizes the fluid line to allow for insertion of the hose barb portion into the fluid line without flexing or bending of the fluid line. The fluid line stabilizer thus allows for easier insertion of the hose barb portion into the fluid line, where a high force may be needed to move the hose barb portion fully into the end of the fluid line. Use of the swage tool (discussed above) to move the fluid coupler into the fluid line further eases the insertion, and may have jaws that are configured for this application (such as jaws that provide a larger gap between the engaging surfaces of the jaws so as to receive the larger fluid line stabilizer and fluid connector thereat). The jaws may comprise any suitable engagement surfaces and may be shaped generally in a reverse manner as shown in FIG. 14, such that the jaws may be disposed at the tool in the orientation shown by the removed jaw in FIG. 15, in order to provide the additional clearance that may be needed to accommodate the fluid line stabilizer and the fluid connector at and between the jaws of the tool.

As shown in FIG. 11, the annular flange 72 may have a convex surface 74 in the shape of a spherical zone, such as in a similar manner as described above. This allows fluid line stabilizer 66 to swivel or pivot somewhat as it is held by first jaw 18, so that the jaw's engagement surface 28 can apply even pressure to the convex engaging surface 74 of fluid line stabilizer 66 during the pressing of the ferrule onto the fitting and fluid line. Although not required, fluid coupler 62 may similarly include a convex engaging surface 76 in the shape of a spherical zone, for engagement by the engagement surface 28 of second jaw 20. This would similarly allow pivoting or swiveling movement of the fluid coupler 62 relative to second jaw 20, so that engaging surface 28 can apply even pressure to engagement surface 76 during insertion of the fluid coupler 62 into fluid line 60.

Optionally, one or both of the jaw elements 118 of swage tool 110, 110' may be configured to be reversed on their respective lever arms (i.e., so that one or both outboard stepped engagement surfaces 148 are facing inwardly) in order to accommodate the extra length of fluid line stabilizer 66, or of an extra-long compression fitting. The reversal of the jaw elements increases the spacing between the outboard engagement surfaces 148 as compared to the spacing of the inboard engagement surfaces 146 when the jaw elements are oriented in the manner shown in FIGS. 14 and 15, for a given position of first lever arm 112 relative to second lever arm 114. This allows for better alignment and increased engagement surface contact area when the swage tool is used on longer-length compression fittings, or with a fluid line stabilizer, for example, whereas leaving the jaw elements 118 with their inboard stepped engagement surfaces 148 facing inwardly (such as shown in FIGS. 14 and 15) would cause the engagement surfaces 148 to contact the corresponding engagement surfaces of the stabilizer or the compression fitting at an increased angle.

Therefore, the present invention provides a swage tool for secure coupling of fluid lines to compression fittings, which is less susceptible to misalignment of the ferrules along the main body of the compression fitting, and which limits or prevents undesired bending or kinking of the fluid lines during attachment of the compression fitting. The partial-spherical or spherical zone-shaped engagement surfaces of the swage tool jaws and the compression fitting permit relative pivoting or swiveling movement of the compression fitting relative to the jaws of the swage tool during the pressing of the ferrule onto the fitting and fluid line. This reduces the need for accurate alignment of the swage tool with the compression tool fitting, and permits an operator to work more quickly because the tool compensates for some degree of misalignment of the parts while still permitting the even application of compressive force during assembly of the ferrules onto the main body of the compression fitting. Optionally, a fluid line stabilizer may be used in conjunction with the swage tool, such as for attaching fluid line couplers or fittings to a flexible fluid line, while reducing the likelihood that the fluid line will bend or buckle or kink during installation of the fluid coupler. Although shown and described as a swage tool for pressing one or more ferrules onto a compression fitting or for joining a fluid line coupler with an end of a fluid line, it is envisioned that, with the appropriate jaws selectively mounted at the lever arms of the tool, the tool of the present invention may be suitable for a variety of fluid line applications, such as where a fitting or element of or associated with a fluid line is moved towards another fitting or element of or associated with a fluid line to join or couple or engage or form or shape one or more fluid lines or fluid line fittings or elements via actuation or rotational driving of the rotational drive element of the tool.

Changes and modifications to the specifically described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A swage tool for coupling a compression fitting to a fluid line, said swage tool comprising:
   first and second lever arms pivotally connected via at least one first pivot joint and having proximal end portions at or near said first pivot joint and distal end portions distal from said first pivot joint;
   a threaded element coupled between said first and second lever arms at a location between said proximal end portions and said distal end portions, wherein said threaded element is pivotally mounted at said first lever arm via a second pivot joint so as to be pivotable about a pivot axis that is generally transverse to a longitudinal axis of said threaded element;
   first and second jaw elements disposed at said distal end portions of said first and second lever arms, respectively, wherein said first jaw element is pivotally attached at said distal end portion of said first lever arm via a third pivot joint, and wherein, when said first jaw element is pivotally attached to said distal end portion of said first lever arm, said first law element is independently pivotable about said third pivot joint relative to said first and second lever arms and relative to said second jaw element irrespective of the position of said first and second lever arms;
   wherein said threaded element is rotatable to impart pivotal movement of said first and second lever arms relative to one another to thereby move said jaw elements between a compression position in which said jaw elements are closer together, and a non-compression position in which said jaw elements are spaced further apart than in the compression position; and
   wherein said first, second and third pivot joints cooperate to substantially align said jaw elements with respective engaging surfaces of the compression fitting during use of said swage tool.

2. The swage tool of claim 1, wherein said threaded element is pivotally mounted at said second lever arm via a fourth pivot joint so as to be pivotable about a pivot axis that is generally transverse to a longitudinal axis of said threaded element.

3. The swage tool of claim 2, wherein said second jaw element is pivotally attached at said distal end of said second lever arm via a fifth pivot joint.

4. The swage tool of claim 3, wherein said first, second, third, fourth and fifth pivot joints cooperate to substantially align said jaw elements with respective engaging surfaces of the compression fitting during use of said swage tool.

5. The swage tool of claim 4, wherein said first lever arm includes a first receiving element pivotally disposed thereat for receiving a portion of said threaded element therethrough and said second lever arm includes a second receiving element pivotally disposed thereat for receiving a threaded portion of said threaded element therethrough, and wherein said second receiving element comprises a threaded passageway for threadedly receiving said threaded portion of said threaded element and wherein said first receiving element does not threadedly engage said threaded element.

6. The swage tool of claim 1, wherein said first jaw element comprises a ferrule-engaging surface for engaging a ferrule of the compression fitting, and said second jaw element comprises a body-engaging surface for engaging a body of the compression fitting.

7. The swage tool of claim 6, wherein at least one of said ferrule-engaging surface and said body-engaging surface comprises at least two stepped surfaces that are adjacent and generally parallel to one another, for engaging a correspondingly-shaped stepped surface of the ferrule or the body of the compression fitting, respectively.

8. The swage tool of claim 7, wherein said ferrule-engaging surface and said body-engaging surface each comprises respective sets of said stepped surfaces for engaging respective stepped surfaces the ferrule and the body of the compression fitting.

9. The swage tool of claim 8, wherein each of said ferrule-engaging surface and said body-engaging surface comprises a generally U-shaped slot for receiving a respective one of the fluid line and the body, and wherein said U-shaped slots are configured to permit removal of the fluid line from said first jaw element and to permit removal of the body from said second jaw element.

10. The swage tool of claim 6, wherein at least one of said ferrule-engaging surface and said body-engaging surface comprises a generally spherical zone surface for pivotally engaging respective ones of the ferrule and the main body of the compression fitting.

11. The swage tool of claim 10, wherein said ferrule-engaging surface and said body-engaging surface each comprises a respective one of said generally spherical zone surfaces for pivotally engaging respective ones of the ferrule and the main body of the compression fitting.

12. The swage tool of claim 11, wherein each of said ferrule-engaging surface and said body-engaging surface comprises a generally U-shaped slot for receiving a respective one of the fluid line and the body, and wherein said U-shaped slots are configured to permit removal of the fluid line from said first jaw element and to permit removal of the body from said second jaw element.

13. The swage tool of claim 1, wherein said threaded element comprises a head portion that projects outwardly from an outboard surface of said first lever arm, said head portion configured to be engaged for rotation by a tool.

14. The swage tool of claim 13, wherein said threaded element is configured to urge said first and second lever arms toward one another when said threaded element is rotated in a rotational direction by a tool, and to permit movement of said first and second lever arms apart from one another when said threaded element is rotated in an opposite rotational direction.

15. The swage tool of claim 14, further comprising a biasing element configured to bias said first and second lever arms apart from one another.

16. The swage tool of claim 15, wherein said biasing element comprises a spring disposed along said threaded element at a location between said first and second lever arms.

17. The swage tool of claim 16, wherein said threaded element comprises a shoulder bolt having a threaded portion spaced from said head portion, and a smooth shaft portion disposed between said head portion and said threaded portion.

18. The swage tool of claim 17, wherein said shoulder bolt further comprises a shoulder portion disposed between said threaded portion and said head portion, said shoulder portion having a larger diameter than a diameter of said threaded portion, and said shoulder portion configured to engage a first receiving element that is pivotally disposed at said first lever arm.

19. The swage tool of claim 1, wherein said first lever arm comprises a stop surface located between said first and third pivot joints, said stop surface configured for engagement by a proximal end portion of said first jaw element, and wherein said stop surface limits inward pivoting of said first jaw element relative to said first lever arm.

20. The swage tool of claim 19, wherein said first jaw element is biased towards contact with said stop surface.

21. The swage tool of claim 19, further comprising a pivot-stop pin spaced from said stop surface, with said proximal end portion of said first jaw element pivotally positioned between said pivot-stop pin and said stop surface, wherein said pivot-stop pin limits outward pivotal movement of said first jaw element relative to said first lever arm.

22. The swage tool of claim 21, wherein said pivot-stop pin is selectively positionable at two or more locations along said first lever arm, and wherein each of said two or more locations corresponds to a different limit to outward pivoting movement of said first jaw element.

23. The swage tool of claim 1, wherein said first and second jaw elements are detachably attached at said distal end portions of said first and second lever arms, respectively.

24. The swage tool of claim 1, wherein said first and second jaw elements are non-detachably attached at said distal end portions of said first and second lever arms, respectively.

25. The swage tool of claim 1, further comprising a handle, wherein said at least one first pivot joint is at said handle.

26. The swage tool of claim 1, further in combination with a fluid line stabilizer for securely holding a flexible fluid line during attachment of a fluid line coupler, said fluid line stabilizer comprising:
a fluid line clamping portion configured to releasably attach to a fluid line, said clamping portion having an inner diameter that is at least slightly smaller than the outer diameter of the fluid line;
a fluid line stabilizing portion having an inner diameter that is larger than the outer diameter of the fluid line;

an engagement surface along an outer portion of said fluid line stabilizer, said engagement surface configured for engagement by one of said jaw elements;

wherein a fluid line connector comprises a hose barb portion for insertion into the fluid line clamped within said fluid line clamping portion, wherein said fluid line connector comprises an engagement surface configured for engagement by another of said jaw elements; and wherein said swage tool is operable to move said hose barb portion into said fluid line within said fluid line stabilizing portion via rotation of said threaded element in a direction that draws said lever arms towards one another.

27. A swage tool for coupling a compression fitting to a fluid line, said swage tool comprising:

first and second lever arms pivotally connected via at least one first pivot joint and having proximal end portions at or near said first pivot joint and distal end portions distal from said first pivot joint;

an actuation mechanism coupled between said first and second lever arms at a location between said proximal end portions and said distal end portions, wherein said actuation mechanism is pivotally mounted at said first lever arm via a second pivot joint so as to be pivotable about a pivot axis that is generally transverse to a longitudinal axis of said actuation mechanism;

first and second jaw elements disposed at said distal end portions of said first and second lever arms, respectively, wherein said first jaw element is pivotally coupled at said distal end portion of said first lever arm via a third pivot joint, and wherein said second jaw element is coupled to said distal end portion of said second lever arm;

wherein said first lever arm comprises a stop element spaced between said first and third pivot joints, and configured for selective engagement by a proximal end portion of said first jaw element, and wherein said stop element limits inward pivoting of a distal end portion of said first jaw element relative to said first lever arm;

wherein said actuation mechanism is operable to impart pivotal movement of said first and second lever arms relative to one another to thereby move said jaw elements between a compression position in which said jaw elements are closer together, and a non-compression position in which said jaw elements are spaced further apart than in the compression position; and wherein said first, second and third pivot joints cooperate to substantially align said jaw elements with respective engaging surfaces of the compression fitting during use of said swage tool.

28. The swage tool of claim 27, further comprising a pivot-stop element positionable at said first lever arm and spaced from said stop element, with said proximal end portion of said first jaw element pivotally positioned between said pivot-stop element and said stop element, wherein said pivot-stop element limits outward pivotal movement of said distal end portion of said first jaw element relative to said first lever arm.

29. The swage tool of claim 28, wherein said pivot-stop element is selectively positionable at any of two or more locations along said first lever arm, and wherein each of said two or more locations corresponds to a different limit to the outward pivoting movement of said distal end portion of said first jaw element.

30. The swage tool of claim 29, wherein:

said second jaw element is pivotally coupled to said second lever arm via a fourth pivot joint;

said second lever arm comprises a second stop element spaced between said first and fourth pivot joints, and configured for selective engagement by a proximal end portion of said second jaw element, and wherein said second stop element limits inward pivoting of a distal end portion of said second jaw element relative to said second lever arm;

said swage tool further comprises a second pivot-stop element positionable at said second lever arm and spaced from said second stop element, with said proximal end portion of said second jaw element pivotally positioned between said second pivot-stop element and said second stop element, wherein said second pivot-stop element limits outward pivotal movement of said distal end portion of said second jaw element relative to said second lever arm; and said second pivot-stop element is selectively positionable at any of two or more locations along said second lever arm, and wherein each of said two or more locations corresponds to a different limit to the outward pivoting movement of said distal end portion of said second jaw element.

31. A swage tool for coupling a compression fitting to a fluid line, said swage tool comprising:

first and second lever arms pivotally connected via at least one first pivot joint and having proximal end portions at or near said first pivot joint and distal end portions distal from said first pivot joint;

an actuation mechanism coupled between said first and second lever arms at a location between said proximal end portions and said distal end portions, wherein said actuation mechanism is pivotally mounted at said first lever arm via a second pivot joint so as to be pivotable about a pivot axis that is generally transverse to a longitudinal axis of said actuation mechanism;

first and second jaw elements disposed at said distal end portions of said first and second lever arms, respectively, wherein said first jaw element is pivotally coupled at said distal end portion of said first lever arm via a third pivot joint, and said second jaw element is coupled to said distal end portion of said second lever arm, and wherein, when said first jaw element is pivotally attached to said distal end portion of said first lever arm, said first law element is independently pivotable about said third pivot joint relative to said first and second lever arms and relative to said second jaw element irrespective of the position of said first and second lever arms;

a pivot-stop element positionable at said first lever arm, spaced between said first and third pivot joints, and configured for selective engagement by a proximal end portion of said first jaw element, wherein said pivot-stop element limits outward pivotal movement of a distal end portion of said first jaw element relative to said first lever arm;

wherein said actuation mechanism is operable to impart pivotal movement of said first and second lever arms relative to one another to thereby move said jaw elements between a compression position in which said jaw elements are closer together, and a non-compression position in which said jaw elements are spaced further apart than in the compression position; and wherein said first, second and third pivot joints cooperate to substantially align said jaw elements with respective engaging surfaces of the compression fitting during use of said swage tool.

32. The swage tool of claim 31, wherein said pivot-stop element comprises a pin that is selectively positionable at any of two or more locations along said first lever arm, and wherein each of said two or more locations corresponds to a different limit to the outward pivoting movement of said distal end portion of said first jaw element relative to said first lever arm.

33. A swage tool for coupling a compression fitting to a fluid line, said swage tool comprising:

first and second lever arms pivotally connected via at least one first pivot joint and having proximal end portions at or near said first pivot joint and distal end portions distal from said first pivot joint;

an actuation mechanism coupled between said first and second lever arms at a location between said proximal end portions and said distal end portions, wherein said actuation mechanism is pivotally mounted at said first lever arm via a second pivot joint so as to be pivotable about a pivot axis that is generally transverse to a longitudinal axis of said actuation mechanism;

first and second jaw elements disposed at said distal end portions of said first and second lever arms, respectively, and positioned distally of said actuation mechanism, wherein said first jaw element is pivotally attached at said distal end portion of said first lever arm via a third pivot joint, wherein said first lever arm includes a distal portion located distally of said third pivot joint and a proximal portion located proximally of said third pivot joint;

a pivot-stop element at said first lever arm between said actuation mechanism and said third pivot joint, and configured for selective engagement by said proximal end portion of said first jaw element, wherein, when said first jaw element is pivotally attached to said distal end portion of said first lever arm, said first jaw element is independently pivotable relative to said second jaw element irrespective of the positions of said first and second lever arms, and said pivot-stop element limits pivotal movement of said first jaw element relative to said first lever arm;

wherein said actuation mechanism is rotatable to impart pivotal movement of said first and second lever arms relative to one another to thereby move said jaw elements between a compression position in which said jaw elements are closer together to apply a compressive force to the compression fitting, and a non-compression position in which said jaw elements are spaced further apart than in the compression position; and wherein said first, second and third pivot joints cooperate to substantially align said jaw elements with respective engaging surfaces of the compression fitting during use of said swage tool to apply the compressive force to the compression fitting.

\* \* \* \* \*

UNITED STATES PATENT AND TRADEMARK OFFICE
CERTIFICATE OF CORRECTION

Page 1 of 1

PATENT NO. : 9,561,584 B2
APPLICATION NO. : 13/653538
DATED : February 7, 2017
INVENTOR(S) : John M. Pierce It is certified that error appears in the above-identified patent and that said Letters Patent is hereby corrected as shown below:

In the Claims

Column 20
Line 52, "law" should read --jaw--;

Column 24
Line 45, "law" should read --jaw--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*